(12) United States Patent
Nagata et al.

(10) Patent No.: US 8,379,172 B2
(45) Date of Patent: Feb. 19, 2013

(54) LIQUID CRYSTAL DISPLAY DEVICE

(75) Inventors: Takayuki Nagata, Osaka (JP); Hiroyuki Furuya, Osaka (JP); Tatsuo Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 251 days.

(21) Appl. No.: 12/935,371

(22) PCT Filed: May 20, 2010

(86) PCT No.: PCT/JP2010/003391
§ 371 (c)(1),
(2), (4) Date: Sep. 29, 2010

(87) PCT Pub. No.: WO2010/137263
PCT Pub. Date: Dec. 2, 2010

(65) Prior Publication Data
US 2011/0116010 A1    May 19, 2011

(30) Foreign Application Priority Data
May 29, 2009 (JP) .................................. 2009-129872

(51) Int. Cl.
*G02F 1/1335* (2006.01)
(52) U.S. Cl. ......................................................... 349/106
(58) Field of Classification Search ........... 349/106–107
See application file for complete search history.

(56) References Cited

U.S. PATENT DOCUMENTS

| | | | |
|---|---|---|---|
| 6,204,899 B1 * | 3/2001 | Hall ................ | 349/65 |
| 7,740,392 B2 | 6/2010 | Itoh et al. | |
| 2007/0019292 A1 | 1/2007 | Kim et al. | |
| 2008/0192173 A1 * | 8/2008 | Itoh et al. ................ | 349/61 |
| 2009/0027600 A1 | 1/2009 | Hisatake | |
| 2009/0190068 A1 | 7/2009 | Kawamura | |
| 2010/0091217 A1 | 4/2010 | Kim et al. | |

FOREIGN PATENT DOCUMENTS

| | | |
|---|---|---|
| JP | 9-113903 | 5/1997 |
| JP | 10-253955 | 9/1998 |
| JP | 11-96819 | 4/1999 |
| JP | 2000-241812 | 9/2000 |

(Continued)

OTHER PUBLICATIONS

International Search Report issued Jun. 29, 2010 in International (PCT) Application No. PCT/JP2010/003391.

*Primary Examiner* — James Dudek
(74) *Attorney, Agent, or Firm* — Wenderoth, Lind & Ponack, L.L.P.

(57) ABSTRACT

A liquid crystal display device has: a light source, a light guide plate for causing light from the light source to enter from a side surface of the light guide plate and exit as illuminating light from one principal surface thereof; a liquid crystal panel which includes a reflective color filter having wavelength selectivity in transmittance and reflectance and a polarizing plate disposed on a side that is closer to the light guide plate than the reflective color filter, and which is disposed on a light path of the illuminating light; and a recycle part for reflecting the illuminating light that has been reflected by the reflective color filter toward the reflective color filter once again, wherein the light from the light source is configured to enter the light guide plate as approximately linear polarization, and the polarizing plate of the liquid crystal panel is configured so exhibit transmittance of 90% or higher.

17 Claims, 14 Drawing Sheets

FOREIGN PATENT DOCUMENTS

| | | |
|---|---|---|
| JP | 2004-45824 | 2/2004 |
| JP | 2004-363062 | 12/2004 |
| JP | 2006-12722 | 1/2006 |
| JP | 2006-235288 | 9/2006 |
| JP | 2006-337485 | 12/2006 |
| JP | 2007-25692 | 2/2007 |
| JP | 2008-170979 | 7/2008 |
| JP | 2008-226829 | 9/2008 |
| JP | 2008-304696 | 12/2008 |
| JP | 2009-31439 | 2/2009 |
| JP | 2009-31535 | 2/2009 |
| WO | 2007/034827 | 3/2007 |
| WO | 2007/077652 | 7/2007 |

* cited by examiner

LIQUID CRYSTAL DISPLAY DEVICE

TECHNICAL FIELD

The present invention relates to a liquid crystal display device with high light utilization efficiency. More specifically, the present invention relates to a liquid crystal display device capable of efficiently guiding light having a predetermined wavelength to the respective sub-pixels of the liquid crystal panel.

BACKGROUND ART

A liquid crystal display device is a system of displaying images by using the electro-optic effect based on the orientation of the liquid crystal molecules, and controlling the amount of transmission of the light that is irradiated from the back surface, and generally speaking a planar illuminating device referred to as a backlight unit configured from a cold-cathode tube or the like is required. In recent years, this kind of liquid crystal display device is being manufactured as larger screens, and liquid crystal display devices for TV use of 50-inch sizes and larger have been put into practical use. Nevertheless, since the power consumption is increasing pursuant to the enlargement of the liquid crystal display device, the development of technology capable of realizing low power consumption is being demanded. Moreover, in order to reduce the space that will be occupied by the liquid crystal display device in a room, thinner liquid crystal display devices are also being strongly demanded.

In order to meet the demand for such thin liquid crystal display devices of low power consumption, the use of light-emitting diodes (hereinafter referred to as the "LED") with favorable luminous efficiency and laser as the light source, and an edge light configuration using a thin light guide plate are being considered. Among the above, a liquid crystal display device of an edge light configuration using the LED as its light source has already been put into practical application.

Moreover, in order to realize low power consumption, consideration is also being given to improving the transmittance of a liquid crystal panel which was conventionally 5% or so. As a major factor that deteriorates the transmittance in a liquid crystal panel, there is a polarizing plat disposed on the backlight unit side of the liquid crystal panel, and a color filter that selectively transmits red light, green light, and blue light for each sub-pixel. Normally, when non-polarizing white line enters the liquid crystal panel, the amount of transmitted light will be ½ with the polarizing plate disposed on the entrance plane. In addition, since red light, green light, and blue light are selectively transmitted for each sub-pixel with the color filter, the amount of transmitted light that became ½ will be further reduced to ⅓ or less thereof.

Among the above, as a method of improving the transmittance with the polarizing plate disposed on the backlight unit side, a configuration of inserting a polarized reflection sheet between the liquid crystal panel and the backlight unit, causing necessary polarization components to be transmitted, reflecting the unwanted polarization components, rotating the polarization of the reflected light, and converting this to a valid polarization component for reuse has been put into practical application.

Moreover, as a method of improving the transmittance with the color filter, proposed is a configuration of using a wavelength separation means such as a diffraction grating to separate the irradiated light that was output from the backlight unit into red light, green light, and blue light, and efficiently focusing them to predetermined sub-pixels of the liquid crystal panel (for example, refer to Patent Documents 1, 2, and 3). In addition, proposed is a configuration of performing wavelength separation of red light, green light, and blue light with an interference filter-type mirror with wavelength selectivity formed on the inside of the light guide plate, and efficiently guiding the light to the predetermined sub-pixels of the liquid crystal panel (for example, refer to Patent Document 4).

Moreover, improvement of the color filter itself is also being considered, and a color filter having a structure that is different from a conventional absorptive color filter has been proposed. For example, proposed is a color filter configured so that the film thickness of a part of the film structure of the interference filter is changed for each region to realize different spectroscopic properties for each region (for example, refer to Patent Document 5). Patent Document 5 aims to improve the color reproducibility by using this color filter.

Furthermore, proposed is a configuration of adding wavelength characteristics to the wire grid polarizing plate or combining the polarization characteristics and wavelength characteristics by using fine grating of subwavelength, configuring a polarization color filter in which the function of the reflective polarization filter and the function of the color filter are integrated, and using this to guide polarized light of a predetermined wavelength to predetermined sub-pixels of the liquid crystal panel (for example, refer to Patent Documents 6 and 7). According to this configuration, the efficiency of the liquid crystal panel can be improved considerably.

Nevertheless, with the foregoing conventional configurations, no specific configuration has been presented for reducing power consumption, or the effect of reducing power consumption is insufficient.

Specifically, Patent Documents 1 to 3 describe a configuration of performing wavelength separation using diffraction and guiding light to the respective sub-pixels of the liquid crystal panel, but Patent Documents 1 to 3 are all unable to sufficiently improve the light utilization efficiency, and further improvement in efficiency is difficult. Specifically, with Patent Documents 1 and 2, since red light, green light, and blue light are separated with a diffraction angle difference of approximately several degrees, it is necessary to shorten the grating pitch to approximately several times the wavelength. With this kind of configuration, it is difficult to sufficiently improve the diffraction efficiency. In addition, with Patent Document 3, since a volume hologram is used, it is possible to perform wavelength separation at a predetermined angle difference. However, since the incidence angle to the volume hologram will be limited, the output efficiency of light that entered the light guide plate will deteriorate.

Moreover, although Patent Document 4 shows a configuration of forming a mirror for performing wavelength separation inside the light guide plate, it is difficult to manufacture a light guide plate having this kind of structure, and there is concern that costs will increase.

Moreover, the color filter described in Patent Document 5 is merely used in substitute for a conventional absorptive color filter, and Patent Document 5 fails to show a configuration of effectively using the reflected light.

Patent Documents 6 and 7 describe using a polarization color filter and reusing light that was reflected off the polarization color filter. Nevertheless, the effect of this polarization color filter is insufficient when used as a substitute for the polarizing plate and color filter of the liquid crystal panel, and, even though the light utilization efficiency can be improved to a certain degree, the picture quality will deteriorate.

Specifically, with the polarization color filter of Patent Document 6, in comparison to a conventional color filter, the transmittance of green light and red light in the blue filter region and the transmittance of red light in the green filter region are high, and the color reproducibility will deteriorate considerably. Moreover, with the polarization color filter of Patent Document 7, transmittance of the unwanted polarization component is 60% or more of the required polarization component, and the contrast will deteriorate since the extinction ratio of light that is guided to the pixels of the liquid crystal panel is inferior.

Patent Document 1: Japanese unexamined Patent Application No. 2000-241812
Patent Document 2: Japanese unexamined Patent Application No. H9-113903
Patent Document 3: Japanese unexamined Patent Application No. H10-253955
Patent Document 4: Japanese unexamined Patent Application No. 2006-12722
Patent Document 5: Japanese unexamined Patent Application No. 2008-170979
Patent Document 6: Japanese unexamined Patent Application No. 2007-25692
Patent Document 7: WO 2007/034827

DISCLOSURE OF THE INVENTION

Thus, an object of this invention is to provide a low power consumption and high quality liquid crystal display device capable of improving the light utilization efficiency more than a conventional configuration and realizing a high quality picture.

In order to achieve the foregoing object, the liquid crystal display device according to one aspect of the present invention has: a light source; a light guide plate for causing light from the light source to enter from a side surface and exit as illuminating light from one principal surface; a liquid crystal panel which includes a reflective color filter having wavelength selectivity in transmittance and reflectance and a polarizing plate disposed on a side closer to the light guide plate than the reflective color filter, and which is disposed on a light path of the illuminating light, and a recycle part for reflecting the illuminating light reflected with the reflective color filter toward the reflective color filter once again, wherein the light from the light source is configured to enter the light guide plate as approximately linear polarization, and wherein the polarizing plate of the liquid crystal panel is configured to exhibit transmittance of 90% or higher.

According to the foregoing configuration, light from the light source is guided to the liquid crystal panel, and the illuminating light that entered the corresponding sub-pixels is transmitted through the reflective color filter and the remaining illuminating light can be reflected with the reflective color filter and reused. Here, since the transmittance of the polarizing plate of the light path through which light to be reused is repeated transmitted is set to be 90% or higher, which is higher than the conventional configurations, it is possible to inhibit the light quantity loss of the light to be reused, and effectively guide the light to the corresponding sub-pixels. It is thereby possible to realize a liquid crystal display device of an extremely low power consumption. Moreover, since light from the light source is caused to enter the light guide plate as linear polarization, the contrast will not deteriorate even if the polarization degree of the polarizing plate is reduced and the transmittance is increased, and it is thereby possible to realize a high quality liquid crystal display device.

Other objects, features and superior aspects of the present invention shall become apparent from the ensuing explanation. In addition, advantages of the present invention shall become evident from the ensuing explanation with reference to the attached drawings.

BEST MODE FOR CARRYING OUT THE INVENTION

Figure 1A:
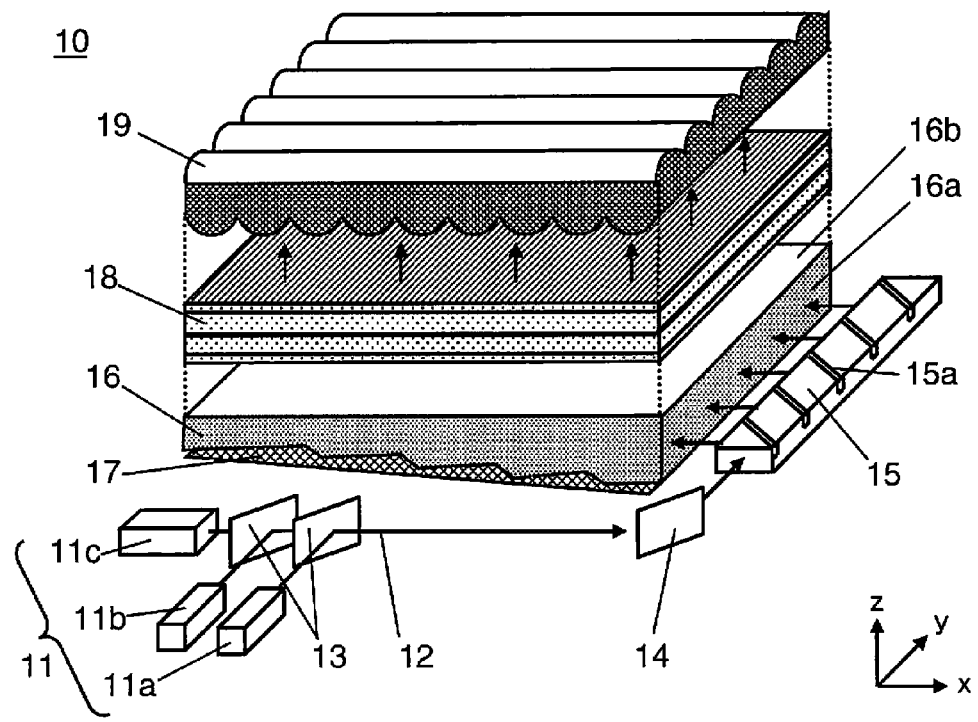
FIG. 1A is a perspective view schematically showing the overall configuration of the liquid crystal display device according to an embodiment of the present invention.

Embodiments of the present invention are now explained with reference to the attached drawings. Note that the same constituent elements shown in the respective diagrams are given the same reference numeral, and the explanation thereof may be omitted. In addition, the diagrams schematically show the respective constituent elements as the subject for ease of understanding, and there are cases where the shape and the like are not accurately displayed.

First Embodiment

Figure 1B:
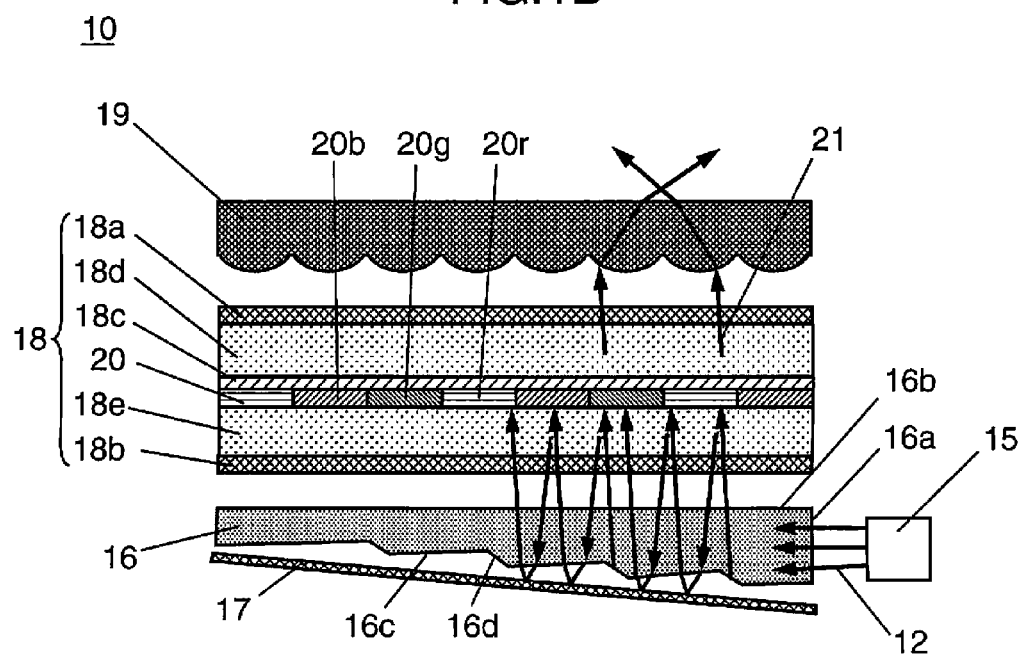
FIG. 1B is a schematic cross section of the xz in-plane of the essential part in FIG. 1A.

FIG. 1A and FIG. 1B are diagrams showing the schematic configuration of the liquid crystal display device according to the first embodiment of the present invention. FIG. 1A is a perspective view schematically showing the overall configuration of the liquid crystal display device, and FIG. 1B shows a cross section of the xz in-plane of the essential part in FIG. 1A. Note that, in FIG. 1A and FIG. 1B, for the ease of understanding of the configuration of the respective parts of the liquid crystal display device, the respective parts are shown to be disposed in isolation. However, in the actual configuration, the respective parts are integrally fixed by being mounted on a base plate or within a frame not shown.

As shown in FIG. 1A and FIG. 1B, the liquid crystal display device 10 according to this embodiment comprises a laser light source 11 configured from three light sources; namely, red laser light source (hereinafter referred to as the "R light source") 11a for outputting a red laser beam (hereinafter referred to as the "R light"), a green laser light source (hereinafter referred to as the "G light source") 11b for outputting a green laser beam (hereinafter referred to as the "G light"), and a blue laser light source (hereinafter referred to as the "B light source") 11c for outputting a blue laser beam (hereinafter referred to as the "B light"); a dichroic mirror 13 for converging the R light, the G light and the B light output from the laser light source 11 as a laser beam 12; a mirror 14 for reflecting the laser beam 12 toward a light guide bar 15; a light guide bar 15 for outputting the laser beam 12 upon converting into linear parallel light; a light guide plate 16 for causing the laser beam 12 that was output from the light guide bar 15 to enter from a side surface 16a and exit from one principal surface 16b; a reflective sheet 17 (recycle part) disposed adjacent to an opposing surface 16c of the principal surface 16b of the light guide plate 16; a liquid crystal panel 18 for displaying an image by modulating, for each pixel, the transmittance of the laser beam 12 that was output from the light guide plate 16; and a cross lenticular lens 19 that is disposed so that the curvature direction of the lenticular lens of the incoming side and the lenticular lens of the outgoing side becomes orthogonal.

Here, the respective light sources 11a, 11b, 11c include a collimated lens, and configured to output parallel light. As the R light source 11a and the B light source 11c, for example, used is a high output semiconductor laser for outputting R light having a wavelength of 640 nm and B light having a wavelength of 445 nm. Moreover, as the G light source 11b, used is a high output SHG laser based on semiconductor laser excitation for outputting G light having a wavelength of 535 nm. In addition, the respective light sources 11a, 11b, 11c are configured to output the R light, the G light, and the B light respectively in the same deflecting direction. As described above, this embodiment is configured to use the laser light source 11 and cause the light to enter the light guide plate 16 as approximately linear polarization.

Moreover, the light guide bar 15 is formed with a plurality of deflection grooves 15a having an inclined plane that is inclined at approximately 45° relative to the side surface from which light is output, and configured to deflect the light that entered the light guide bar 15 approximately 90° based on total reflection. The cross section of the xz in-plane of the light guide bar 15 is configured to be an approximate rectangle, and configured so that the polarization of the light that entered as polarization in the x-axis direction or the z-axis direction in FIG. 1A is not disturbed.

Moreover, as shown in FIG. 1B, the opposing surface 16c of the light guide plate 16 is formed with a plurality of deflected surfaces 16d formed of an inclined plane that is inclined at approximately 45° relative to the principal surface 16b, and configured to deflect the light that entered the principal surface 16b in an approximately parallel manner toward the principal surface 16b based on total reflection, and output the light from the principal surface 16b approximately perpendicularly. The deflected surface 16d is configured to be perpendicular to the xz plane, and configured so that the polarization of the light that entered as polarization in the y-axis direction or the z-axis direction is not disturbed.

Moreover, the liquid crystal panel 18 is structured such as the liquid crystal layer 18c and the reflective color filter 20 are sandwiched with a pair of glass substrates 18d, 18e, and additionally sandwiching these with the polarizing plates 18a, 18b from either end. In comparison to a liquid crystal panel of standard structure, the difference is in that the reflective color filter 20 is used in substitute for an absorptive color filter made of pigments or the like. Note that the transmission axis of the polarizing plate 18b is configured to coincide with the polarization direction of the laser beam 12 (illuminating light) that is output from the light guide plate 16.

Figure 2A:
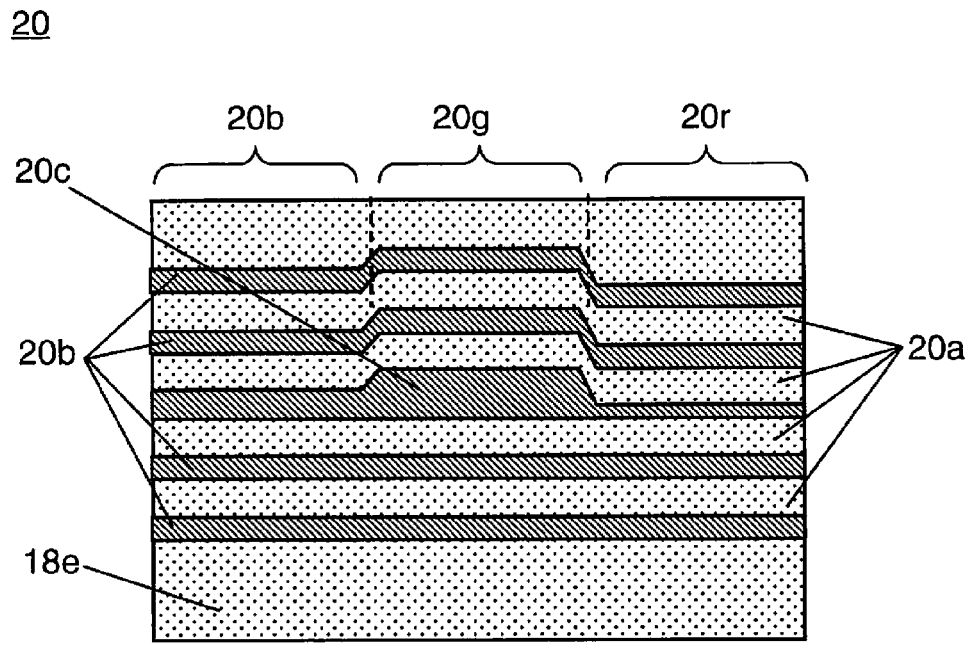
FIG. 2A is a schematic diagram showing the schematic configuration of the reflective color filter according to an embodiment of the present invention.
Figure 2B:
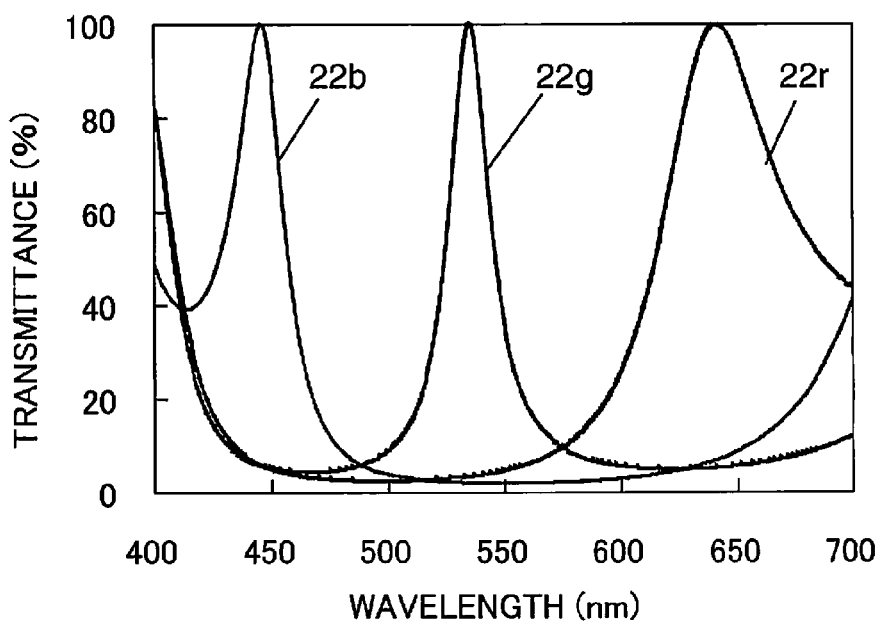
FIG. 2B is a characteristics diagram showing the spectroscopic properties of the reflective color filter according to an embodiment of the present invention.

The reflective color filter 20 is configured, for example, as an interference filter as shown in FIG. 2A. FIG. 2A and FIG. 2B are explanatory diagrams showing the schematic configuration and characteristics of the reflective color filter 20, wherein FIG. 2A is a schematic diagram showing the film structure of the interference filter, and FIG. 2B is a characteristics diagram showing the spectroscopic properties of the film structure shown in FIG. 2A, whereby the horizontal axis shows the wavelength (nm) and the vertical axis shows the transmittance (%).

In FIG. 2A, the reflective color filter 20 is configured by laminating a low refractive index layer 20a configured from a low refractive index material (for example, silicon dioxide ($SiO_2$)), a high refractive index layer 20b configured from a high refractive index material (for example, titanium dioxide ($TiO_2$)), and a defect layer 20c configured from a high refractive index material. Moreover, the thickness of the respective layers; namely, the low refractive index layer 20a and the high refractive index layer 20b is configured so that the optical film thickness that is obtained by multiplying the physical film thickness by the refractive index becomes approximately equal to ¼ of the set wavelength (for example, 535 nm), and configured to be the same film thickness in each region. Meanwhile, the defect layer 20c has a different thickness in each region, and is configured to transmit light of a specific wavelength.

The spectroscopic properties of the region 20r, the region 20g, and the region 20b configured as described above will become the spectroscopic properties 22r, 22g, 22b shown in FIG. 2B, and since the respective regions have high transmittance relative to the R light, the G light, or the B light, the reflective color filter 20 can be used in substitute for a conventional color filter.

Moreover, since the interference filter hardly absorbs light, light that does is not transmitted through the reflective color filter 20 is basically reflected. Accordingly, the region 20r transmits the R light while reflecting the G light and the B light, the region 20g transmits the G light while reflecting the R light and the B light, and the region 20b transmits the B light while reflecting the R light and the G light.

Note that the reflective color filter 20 is able to increase reflectance relative to the unwanted wavelength by increasing the number of layers of the low refractive index layer 20a and the high refractive index layer 20b or reducing the transmittance of the unwanted wavelength. Although the number of processes will increase if the number of layers is increased, since the transmission of light of unwanted wavelength from the respective regions can be further inhibited, the color reproducibility of the image display can be further improved. Moreover, if the number of layers of the defect layer 20c is increased, the wavelength range capable of obtaining high transmittance can be broadened, and the likelihood of a wavelength error of the light source or an error such as variation in the incidence angle can be reduced.

The operation of the planar illuminating device (liquid crystal display device 10) of this embodiment configured as described above is now explained in detail.

As shown in FIG. 1A, the R light, the G light and the B light output as the same polarization in the z-axis direction from the R light source 11a, the G light source 11b and the B light source 11c are collimated for each light source, and condensed as the laser beam 12 by the dichroic mirror 13. The laser beam 12 enters the light guide bar 15 via the mirror 14, is defected by approximately 90 degrees while retaining the polarization with a plurality of deflection grooves 15a, and output from the light guide bar 15 so that the light quantity per unit area becomes uniform. The laser beam 12 output as the polarization in the z-axis direction from the light guide bar 15 enters the principal surface 16b in a state where the incidence angle is 2 degrees or less; that is, in an approximately parallel state relative to the side surface 16a of the light guide plate 16. The laser beam 12 that entered the light guide plate 16 is totally reflected with the defected surface 16d formed on the opposing surface 16c of the light guide plate 16 and then deflected toward the principal surface 16b, becomes polarization in the x-axis direction and is output from the principal surface 16b to the principal surface 16b approximately perpendicularly, and enters then the liquid crystal panel 18.

Here, since the polarization direction of the laser beam 12 that is output from the light guide plate 16 and the transmission axis of the polarizing plate 18b of the liquid crystal panel 18 are configured to coincide, most of the light is transmitted through the polarizing plate 18b, and the light quantity loss at such time can be considerably reduced in comparison to cases where random polarization falls incident.

The laser beam 12 that entered the liquid crystal panel 18 reaches the reflective color filter 20, and the R light that entered the region 20r, the G light that entered the region 20g and the B light that entered the region 20b are respectively transmitted therethrough and output from the reflective color filter 20 as the outgoing beam 21, and the remaining light is reflected off the reflective color filter 20.

The laser beam 12 that reflected off the reflective color filter 20 returns from the liquid crystal panel 18 to the light guide plate 16, passes through the light guide plate 16 and is reflected off the reflective sheet 17 (recycle part), once again passes through the light guide plate 16 and enters the liquid crystal panel 18, and once again enters the reflective color filter 20. Here, once again, only the predetermined light that entered the predetermined filter region is transmitted and output from the reflective color filter 20 as the outgoing beam 21, and the remaining light is reflected off the reflective color filter 20.

Here, the laser beam 12 that was once again reflected with the reflective color filter 20 similarly repeats the reflection between the reflective color filter 20 and the reflective sheet 17. The laser beam 12 ultimately enters the corresponding filter region and is output as the outgoing beam 21 from the reflective color filter 20.

The polarization direction of the outgoing beam 21 that passed through the reflective color filter 20 is modulated with the liquid crystal layer 18c, and, since only the predetermined polarization component is output with the polarizing plate 18a, it is subject to brilliance modulation for each sub-pixel and then output from the liquid crystal panel 18, diffused with the cross lenticular lens 19, and a bright image with a wide view angle is thereby displayed.

As explained above, since the liquid crystal display device 10 of the first embodiment is able to efficiently guide light of a predetermined wavelength to the corresponding sub-pixels by transmitting the R light, the G light or the B light that entered the corresponding sub-pixels among the light that entered the liquid crystal panel 18, and reflecting and reusing the remaining light, it is possible to realize a 1 liquid crystal display device of low power consumption and extremely high light utilization efficiency.

In this configuration, the reflective color filter 20 is configured by applying an interference filter, and the thickness is approximately 1 µm. Thus, it can be easily built into the liquid crystal panel 18, and it is possible to realize extremely high transmittance relative to a specific wavelength. In addition, since the configuration comprising the laser beam source 11 that outputs a laser beam having a narrow wavelength interval, it is possible to utilize the characteristics of the peak of the reflective color filter 20 and effectively improve the light utilization efficiency.

Moreover, by using the laser beam source 11, in addition to being able to use the polarization, it is possible to the directive property and guide the laser beam 12 to the liquid crystal panel 18 without disturbing the polarization. It is thereby possible to inhibit the loss of light quantity with the polarizing plate 18b and further improve the light utilization efficiency.

Moreover, by using the laser beam 12, superior color reproducibility can be realized. In addition, a high contrast can be obtained based on a configuration of causing the laser beam 12 to enter the liquid crystal panel 18 approximately perpendicularly. It is thereby possible to realize a high quality liquid crystal display device. Furthermore, based on an edge light-type configuration using the light guide plate 16, the overall device can be configured extremely thin.

Meanwhile, in this embodiment, since the configuration is such that the laser beam 12 repeats reflection between the reflective color filter 20 and the reflective sheet 17 (hereinafter referred to as the "recycle"), it passes through the polarizing plate 18b numerous times during the recycle operation. Thus, the transmittance of the polarizing plate 18b is largely affected by the utilization efficiency of the light to be recycled. Under normal circumstances, the transmittance of a standard polarizing plate is approximately 80 to 85% even if the light falls incident upon causing the transmission axis of the polarizing plate and the polarization direction to coincide. However with the foregoing configuration, since the light quantity loss is inhibited while the illuminating light is repeatedly transmitted through the polarizing plate, the transmittance of the polarizing plate 18b is desirably at least 90% or higher.

Figure 3:
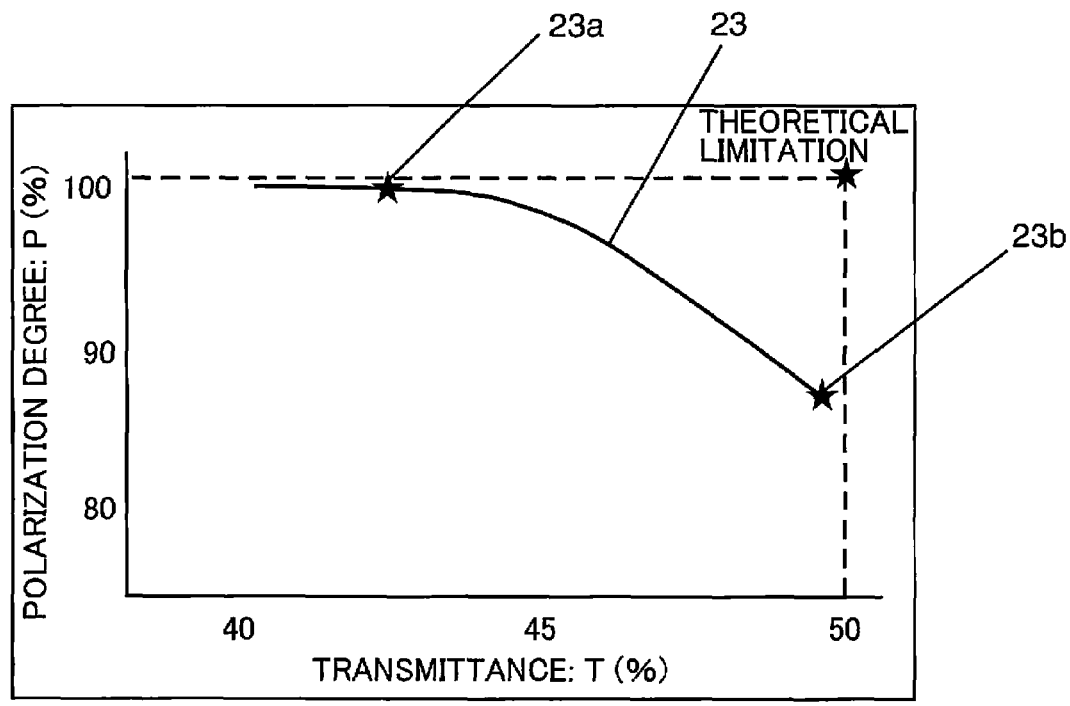
FIG. 3 is a characteristics diagram showing the characteristics of the polarizing plate of a standard iodine system.

FIG. 3 is a characteristics diagram showing the characteristics of a standard polarizing plate, wherein the horizontal axis shows the transmittance (%) upon causing random polarized light to fall incident and the vertical axis shows the polarization degree (%). Here, the polarization degree is a value that is represented by:

$$P = \sqrt{((T1-T2)/(T1+T2))} \times 100(\%)$$

when the transmittance of the random polarization upon overlapping the polarizing plate to be parallel with the transmission axis is defined as T1, and the transmittance of the random polarization upon overlapping the polarizing plate to be orthogonal to the transmission axis is defined as T2.

As evident from the characteristic curve 23 of FIG. 3, with a standard polarizing plate, the polarization degree will deteriorate if the transmittance is increased. This tendency is common to all polarizing plates, and shows that the transmittance is increased by weakening the polarization dependence of the polarizing plate. If the polarization degree is low, the extinction ratio of the laser beam 12 that enters the liquid crystal panel 18 will deteriorate, and the contrast of the image that is output from the liquid crystal panel 18 will consequently deteriorate. Thus, with a conventional liquid crystal panel, a polarization degree of 99% or higher was required, and configured such that the transmittance becomes approximately 40 to 42.5% (for example, characteristic 23a). Specifically, the transmittance of the polarization component that is parallel to the transmission axis is approximately 80 to 85%.

Meanwhile, in this embodiment, since it is desirable to set the transmittance of the light guide plate 18b to be 90% or higher, it is necessary to reduce the polarization degree of the polarizing plate (for example, characteristic 23b). Here, if the deterioration in contrast is significant, it is desirable to adopt a configuration where another sheet of the polarization element is inserted between the light guide plate 16 and the light guide bar 15 to increase the extinction ratio of the laser beam 12 before entering the polarizing plate 18b.

Figure 4:
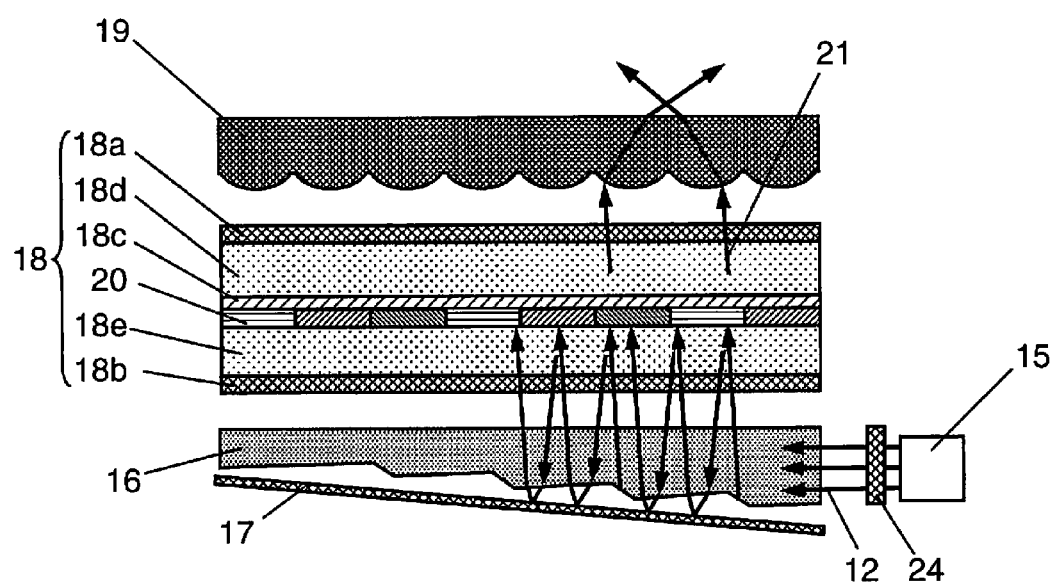
FIG. 4 is a cross section showing another configuration example of the liquid crystal display device according to an embodiment of the present invention.

FIG. 4 is a cross section showing another configuration example of the liquid crystal display device according to the first embodiment of the present invention, and shows the configuration of inserting the polarization element 24 into the configuration shown in FIG. 1B. According to this kind of configuration, since the extinction ratio of the laser beam 12 to enter the light guide plate 16 can be increased with the polarization element 24, it is possible to prevent the deterioration in the contrast resulting from reducing the polarization degree of the polarizing plate 18b. Moreover, even if the polarization is rotated during the recycle process, the high extinction ratio can be maintained as a result of passing through the polarizing plate 18b. In addition, since the loss of light quantity during the recycle process can be reduced, it is possible to realize a lower power consumption, high contrast liquid crystal display device.

Figure 5A:
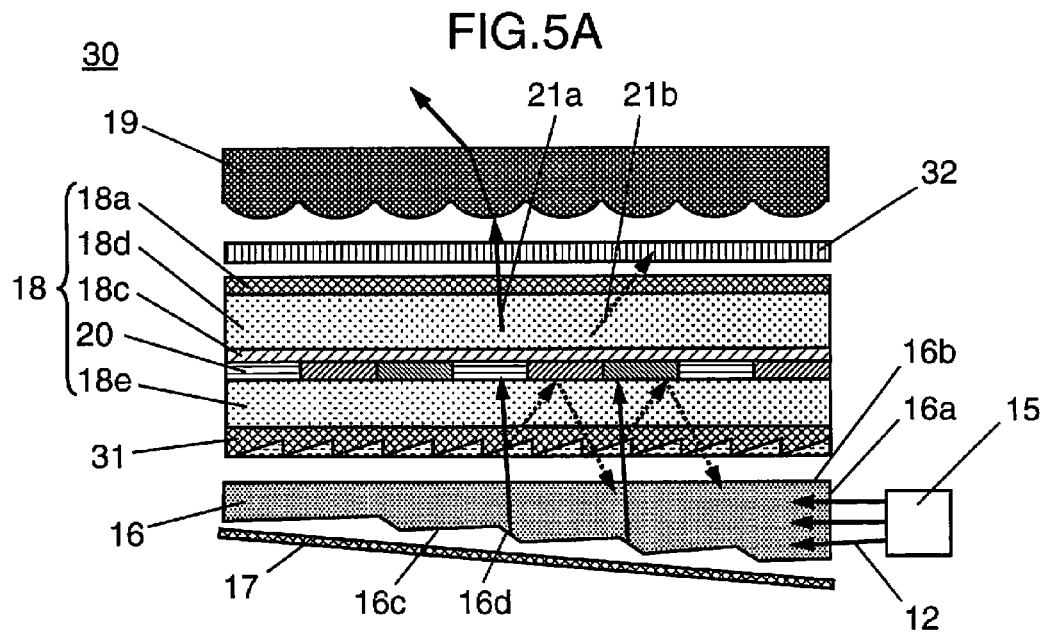
FIG. 5A is a schematic cross section of the essential part in yet another configuration example of the liquid crystal display device according to an embodiment of the present invention.
Figure 5B:
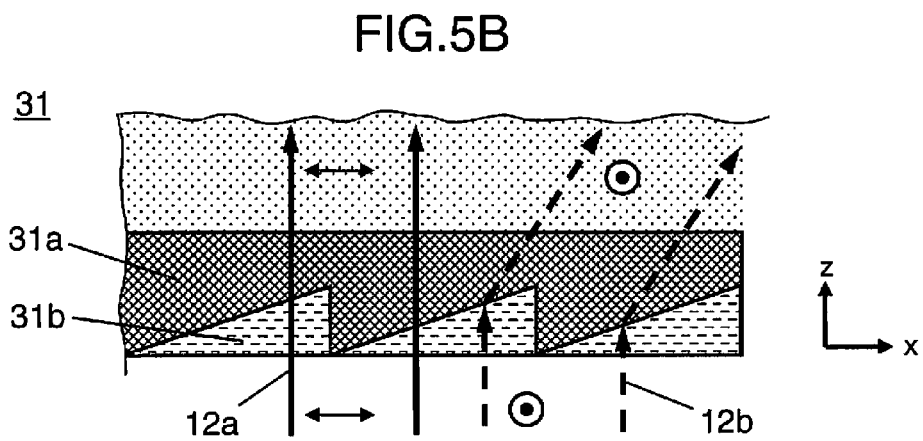
FIG. 5B is a schematic enlarged view showing the polarization hologram in FIG. 5A.
Figure 5C:
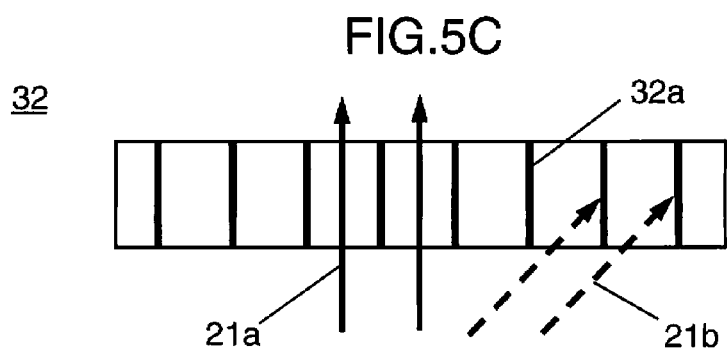
FIG. 5C is a schematic enlarged view of the view angle control film in FIG. 5A.

Otherwise, another polarization separation element with high transmittance may be used in substitute for the polarizing plate 18b. FIG. 5A to FIG. 5C are schematic configuration diagrams showing yet another embodiment of the liquid crystal display device according to an embodiment of the present invention, wherein FIG. 5A is a cross section of the essential part of the liquid crystal display device 30, FIG. 5B is an enlarged view of the polarization hologram 31 in FIG. 5A, and FIG. 5C shows an enlarged view of the view angle control film 32 in FIG. 5A.

The configuration of FIG. 5A differs from the configuration of FIG. 1B in that a polarization hologram 31 (polarization separation element) is disposed in substitute for the polarizing plate 18b of FIG. 1B and a view angle control film 32 is inserted between the liquid crystal panel 18 and the cross lenticular lens 19. Since the remaining configuration is the same as the configuration of FIG. 1B, the same reference numeral is given and the explanation thereof is omitted.

Here, as shown in FIG. 5B, the polarization hologram 31 is configured from an optical isotropic material 31a and an optical anisotropic material 31b, and the boundary of the two is formed in a serrated shape. The optical anisotropic material 31b is configured so that light of the polarization component (first polarization component) in the x-axis direction in FIG. 5B becomes a normal light beam, and so that light of the polarization component (second polarization component) in the y-axis direction becomes an abnormal light beam. Moreover, the refractive index of the normal light beam of the optical anisotropic material 31b and the refractive index of the optical isotropic material 31a are configured to be equal, and the refractive index of the abnormal light beam of the optical anisotropic material 31b is configured to be greater than the refractive index of the normal light beam.

Moreover, as shown in FIG. 5C, the view angle control film 32 is configured from a sheet in which louvers 32a are aligned in parallel, and the louvers 32a are configured to absorb the light that enters obliquely.

Note that the spectroscopic properties of the reflective color filter 20 that is configured from an interference filter have angle dependence, and the transmitted wavelength shifts to the shorter wavelength side when the incidence angle is increased. It can thereby also function as a filter for reflecting the RGB light with a large incidence angle.

With the liquid crystal display device 30 configured as described above, although not shown in the diagrams, as with the configuration shown in FIG. 1A, the R light, the G light and the B light output as the same polarization direction from the R light source, the G light source and the B light source are collimated for each light source, condensed as the laser beam 12 by the dichroic mirror and enters the light guide bar 15, and a uniform laser beam 12 with polarization that is aligned is output from the light guide bar 15. The laser beam 12 output from the light guide bar 15 enters the light guide plate 16 in a state where the incidence angle is 2 degrees or less; that is, in an approximately parallel state relative to the side surface 16a.

Here, if the polarization direction of the laser beam 12 that entered the light guide plate 16 is the z-axis direction, the laser beam 12 that entered the light guide plate 16 is totally reflected with the defected surface 16d formed on the opposing surface 16c and then deflected toward the principal surface 16b, and output from the principal surface 16b to the polarization hologram 31 approximately perpendicularly relative to the principal surface 16b as the polarization of the x-axis direction.

Here, with the polarization hologram 31, since the refractive index of the optical isotropic material 31a and the refractive index of the optical anisotropic material 31b are equal relative to the polarization component 12a in the x-axis direction (first polarization component that is required for image display in the liquid crystal panel 18), the boundary of the optical isotropic material 31a and the optical anisotropic material 31b will not optically exist. Thus, the polarization component 12a that enters the polarization hologram 31 is transmitted as is.

Meanwhile, with the polarization hologram 31, since there is a refractive index difference between the optical isotropic material 31a and the optical anisotropic material 31b relative to the polarization component 12b in the y-axis direction (second polarization component that is unwanted in the image display), it will become a blazed diffraction element with serrated phase steps. Thus, the polarization component 12b that enters the polarization hologram 31 will be diffracted.

The polarization component 12a of the laser beam 12 that passed through the polarization hologram 31 reaches the reflective color filter 20, and only predetermined light that entered a predetermined filter region is transmitted and output as the outgoing beam 21a from the reflective color filter 20, and the remaining light is reflected off the reflective color filter 20. The polarization component 12a that was reflected off the reflective color filter 20 is repeatedly reflected between the reflective color filter 20 and the reflective sheet 17 (recycle part), ultimately enters the corresponding filter region, and is output as the outgoing beam 21a from the reflective color filter 20.

Here, since the polarization hologram 31 functions as a flat plate with high transmittance relative to the polarization component 12a, the light quantity that will be lost due to the absorption or scattering during the recycle process will be minimal. Thus, the polarization component 12a will be subject to wavelength separation efficiently and output from the respective regions of the reflective color filter 20.

Meanwhile, the polarization component 12b of the laser beam 12 that was diffracted with the polarization hologram 31 enters the reflective color filter 20 at a specific incidence angle, and is mostly reflected due to the angle dependence of the spectroscopic properties of the reflective color filter 20. The polarization component 12b that was reflected with the reflective color filter 20 is repeatedly reflected between the reflective color filter 20 and the reflective sheet 17, ultimately output from the side of the side surface 16a of the light guide plate 16 as stray light, and absorbed with the case, cover or the like not shown.

The polarization direction of the outgoing beam 21 that passed through the reflective color filter 20 is modulated with the liquid crystal layer 18c, and, since only the predetermined polarization component is output with the polarizing plate 18a, it is subject to brilliance modulation for each sub-pixel and output from the liquid crystal panel 18, and then enters view angle control film 32. Here, a part of the polarization component 12b of the laser beam 12 also passes through the reflective color filter 20, and similarly enters the view angle control film 32 as the outgoing beam 21b.

Since the outgoing beam 21a that entered the view angle control film 32 will enter the view angle control film 32 approximately perpendicularly, it pass directly therethrough and is diffused with the cross lenticular lens 19, and a bright image with a wide view angle is thereby displayed. Meanwhile, the outgoing beam 21b that entered the view angle control film 32 is absorbed by the view angle control film 32 since its incidence angle is large.

Accordingly, only the polarization component 12a that passed through the polarization hologram 31 is used for the image display, and the polarization component 12b is not output from the screen of the liquid crystal display device 30.

As explained above, the liquid crystal display device 30 as another mode of the first embodiment is able to further improve the transmittance of the polarization component 12a as the polarization component that is required for image display by replacing the polarizing plate on the backlight side of the liquid crystal panel 18 with the polarization hologram 31. It is thereby possible to further inhibit the deterioration in the light quantity of the polarization component 12a that occurs during the repeated reflection between the reflective color filter 20 and the reflective sheet 17.

Moreover, since the polarization hologram 31 is blazed in the shape of the diffraction grating, high diffraction efficiency can be obtained. In addition, since the laser beam 12 passes through the polarization hologram 31 numerous times while being repeatedly reflected between the reflective color filter 20 and the reflective sheet 17, the outgoing beam 21a is able to realize an extremely high extinction ratio, and a high contrast image can thereby be displayed.

Moreover, since the polarization component 12b as the unwanted polarization component will not be output from the screen of the liquid crystal display device 30 by being reflected with the reflective color filter 20 or absorbed by the view angle control sheet 32, it is possible to prevent the contrast from deteriorating. Accordingly, it is possible to realize a high contrast and thin liquid crystal display device of extremely low power consumption.

Note that, in the configuration shown in FIG. 5A to FIG. 5C, in substitute for the polarization hologram 31, a similar effect can be yielded by disposing a prism or diffusion layer with polarization selectivity which is configured to transmit a specific polarization component and refract or scatter the other polarization components.

Moreover, in this embodiment, the liquid crystal panel 18 comprises a transparent electrode and a TFT (Thin Film Transistor) for driving the liquid crystal layer 18c. Since the transmittance of the transparent electrode and TFT is not 100%, if these are disposed in the recycle light path, a part of the recycled light will be lost each time such recycled light passes through the transparent electrode and TFT, which is similar to the light quantity loss of the recycled light that occurs with the polarizing plate 18b, and the utilization efficiency of the recycled light will deteriorate. Accordingly, desirably, the configuration is such that the reflective color filter 20 is disposed on a side that is closer to the light guide plate 16 than the transparent electrode and TFT so that the transparent electrode and TFT will not exist in the recycle light path. Specifically, the transparent electrode and TFT are desirably disposed between the reflective color filter 20 and the liquid crystal layer 18c, or between the liquid crystal layer 18c and the glass substrate 18d.

Figure 12A:
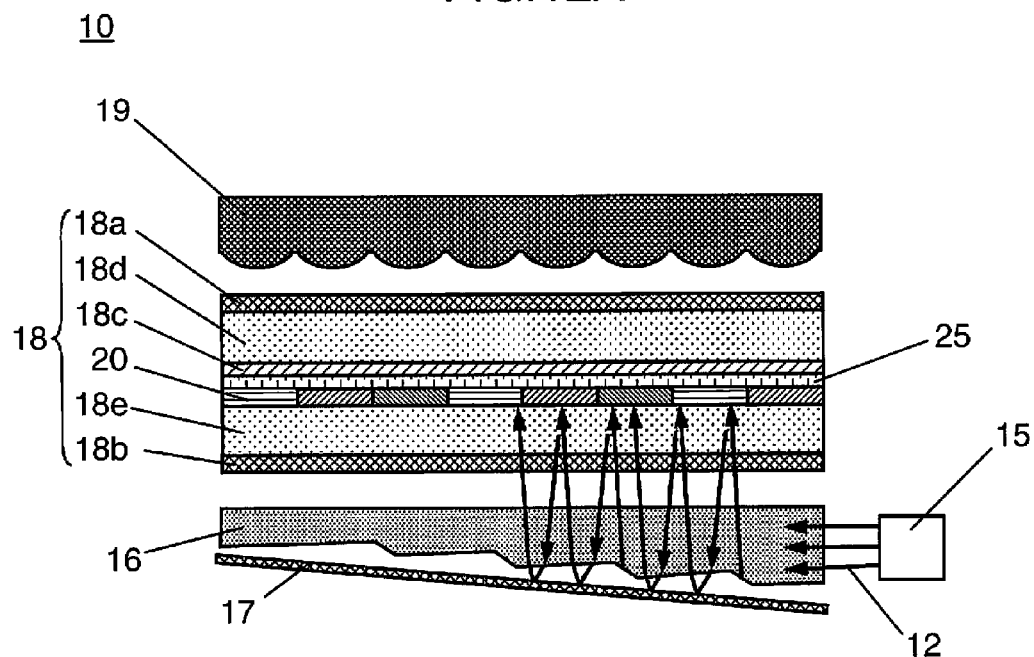
FIG. 12A is a schematic cross section of the essential part in yet another configuration example of the liquid crystal display device according to an embodiment of the present invention.
Figure 12B:
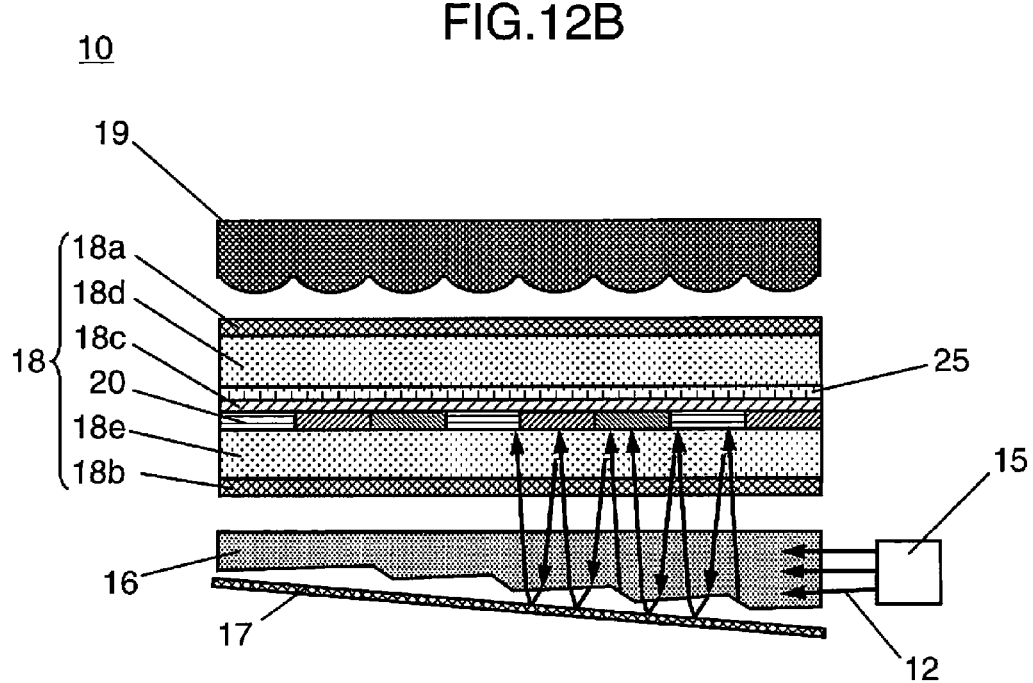
FIG. 12B is a schematic cross section of the essential part in yet another configuration example of the liquid crystal display device according to an embodiment of the present invention.

Specifically, as shown in FIG. 12A, the configuration may be such that the reflective color filter 20 is disposed on a side that is closer to the light guide plate 16 than the liquid crystal layer 18c, and the liquid crystal driving layer 25 formed with a transparent electrode and TFT is disposed between the liquid crystal layer 18c and the reflective color filter 20. Otherwise, as shown in FIG. 12B, the configuration may be such that the reflective color filter 20 is disposed on a side that is closer to the light guide plate 16 than the liquid crystal layer 18c, and the liquid crystal driving layer 25 formed with a transparent electrode and TFT is disposed on a side that is opposite to the reflective color filter 20 across from the liquid crystal layer 18c. When configured as shown in FIG. 12A or FIG. 12B, the light utilization efficiency can be improved further, and a low power consumption liquid crystal display device can be realized.

Note that, although an example of using TFT as the liquid crystal driving element (active element) was provided above, the present invention is not limited to the above, and another liquid crystal driving element; for instance, MIM (Metal Insulator Metal) or the like may also be used.

Moreover, although the laser light source 11 is used in this embodiment, the present invention is not limited thereto, and, for example, a light-emitting diode (hereinafter referred to as the "LED") or a super luminescent diode (hereinafter referred to as the "SLD") may also be used as the light source. SLD is a light source which possess both high brilliance as with a laser light source and low interference properties as with an LED. By using these light sources, it is possible to inhibit the influence of speckle noise and further improve the image quality.

However, since the light of a light source using an LED, SLD or the like has a broader wavelength interval than a laser beam, it must be configured so that the transmission wavelength interval of the reflective color filter is broad. This kind of configuration can be realized by increasing the number of layers of the defect layer 20c than the film structure shown in FIG. 2A.

Figure 13A:
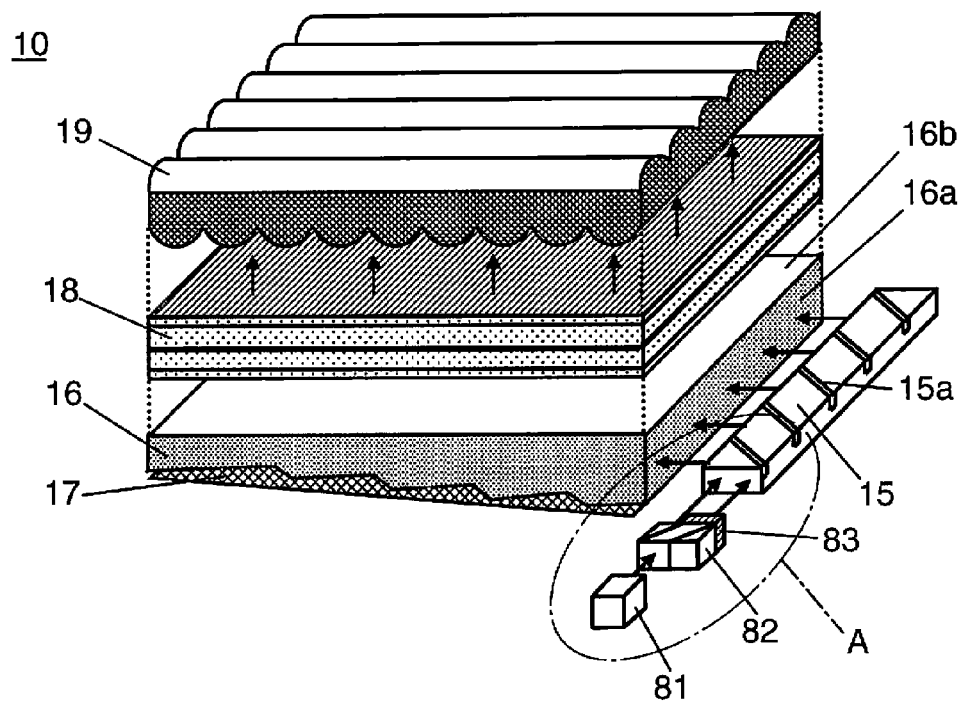
FIG. 13A is a perspective view schematically showing yet another configuration example of the liquid crystal display device according to an embodiment of the present invention.
Figure 13B:
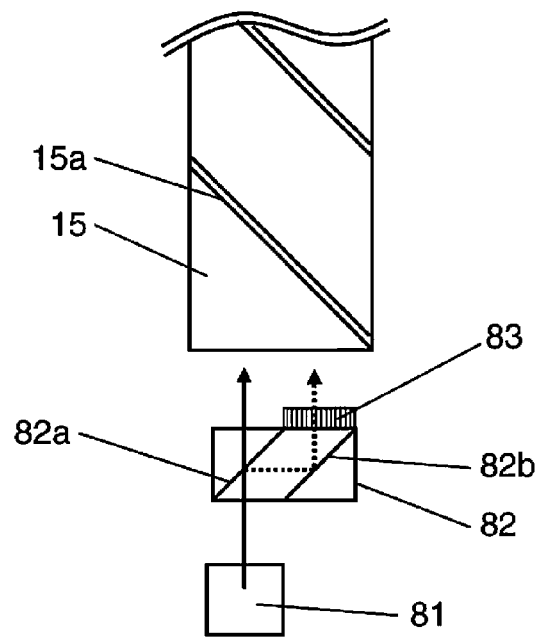
FIG. 13B is an enlarged view showing the schematic configuration of the A part in FIG. 13A.

Moreover, when applying a non-polarizing light source using an LED, SLD or the like, a configuration of aligning and entering the polarization in the light guide plate 16 is required. This configuration can be realized by performing polarization separation with a polarization beam splitter (PBS), and performing polarization rotation to the one of the separate lights with a half wavelength plate. This configuration example is shown in FIG. 13A and FIG. 13B. FIG. 13A is a cross section of the essential part of the liquid crystal display device 10, and FIG. 13B is an enlarged view of the A part in FIG. 13A. As shown in FIG. 13A, the liquid crystal display device 10 comprises a light source 81, a polarization beam splitter 82, and a half wavelength plate 83. The polarization beam splitter 82 and the half wavelength plate 83 configure a polarization conversion element for aligning the polarization components of the light that is output from the light source 81.

The light source 81 is a non-polarizing light source using an LED, SLD or the like, includes a collimator not shown, and outputs parallel light. As shown in FIG. 13B, the polarization beam splitter 82 includes PBS surfaces 82a formed at positions where light that is output from the respective light sources 81 will fall incident. Each PBS surface 82a transmits one polarization component (for example, P polarization component) of the light that was output from the light source 81 while reflecting the other polarization component (for example, S polarization component). Moreover, the polarization beam splitter 82 includes mirror surfaces 82b which respectively reflect the light of the S polarization component that was reflected off the respective PBS surfaces 82a. The respective mirror surfaces 82b have the function of deflecting light of the S polarization component in a direction that is approximately the same as the advancing direction of the light of the P polarization component that passed through the PBS surface 82a.

The half wavelength plate 83 is provided to a position where the light of the S polarization component reflected off the respective mirror surfaces 82b will fall incident, and functions as the polarization conversion prism for rotating the polarization of the light of the S polarization component by 90 degrees. The light of the S polarization component in the half wavelength plate 83 becomes the P polarization by being rotated 90 degrees. Thus, light that passed through the respective PBS surfaces 82a and was output from the polarization beam splitter 82 and light that was output from the respective half wavelength plates 83 will both be of state where the polarization direction is aligned as the P polarization. The polarization beam splitter 82 and the half wavelength plate 83 function as the polarization element that is provided in the light path between the light source 81 and the light guide plate 16 and which improves the extinction ratio of the light that enters the light guide plate 16.

As shown in FIG. 13A, light (P polarization in this example) that was output from the polarization beam splitter 82 and the half wavelength plate 83 and having an aligned polarization direction enters the light guide bar 15. The light guide bar 15 is parallel or perpendicular to the polarization that enters the side surface, and is deflected while maintaining the polarization. Uniform light with an aligned polarization is thereby output from the light guide bar 15, and the light that is output from the light guide bar 15 enters the light guide plate 16 in a state where the incidence angle is 2 degrees or less; that is, in an approximately parallel state relative to the side surface 16a. Since operations after the light enters the light guide plate 16 are the same as those configured as shown in FIG. 1A, an explanation thereabout is omitted.

Figure 14A:
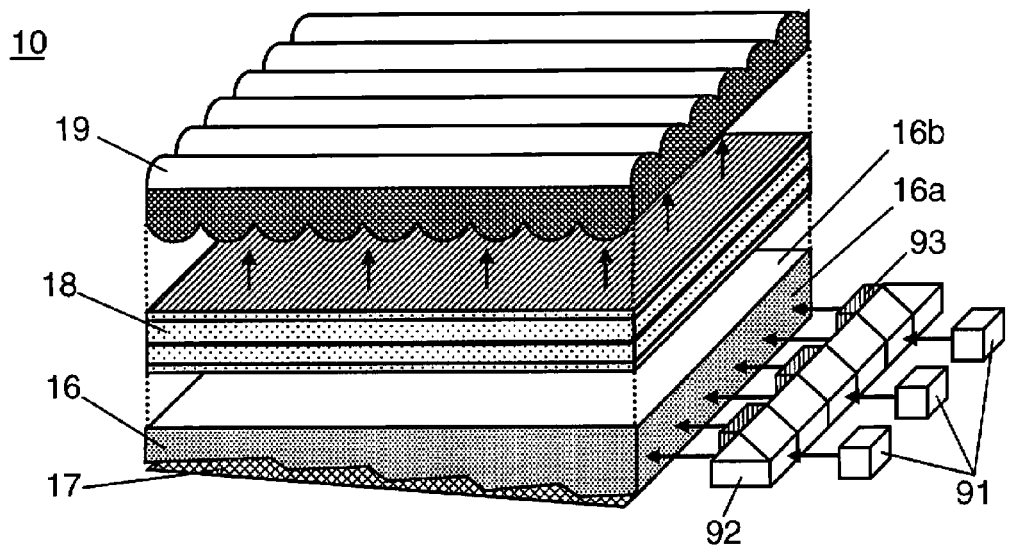
FIG. 14A is a perspective view schematically showing yet another configuration example of the liquid crystal display device according to an embodiment of the present invention.
Figure 14B:
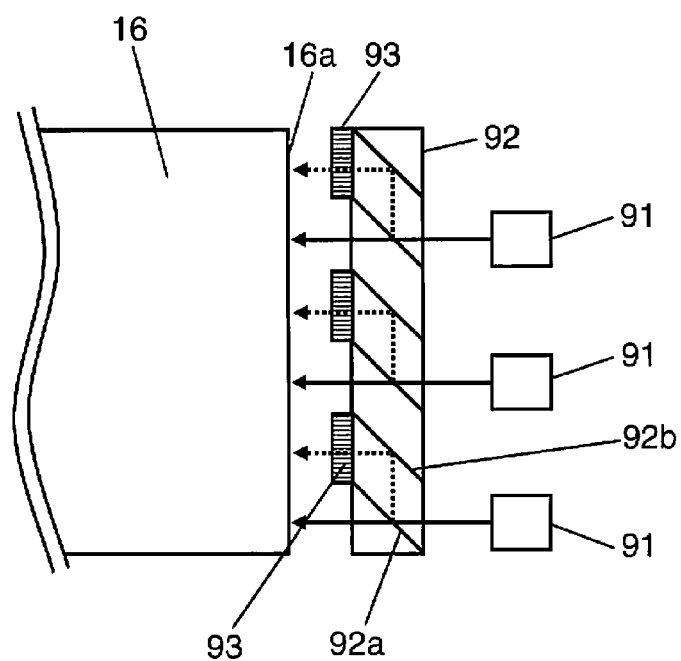
FIG. 14B is a schematic plan view showing the light source, the polarization beam splitter and the half wavelength plate in FIG. 14A.

Moreover, in cases of applying a non-polarizing light source using an LED, SLD or the like, another configuration example of causing the polarization to enter the light guide plate 16 in alignment is shown in FIG. 14A and FIG. 14B. FIG. 14A is a cross section of the essential part of the liquid crystal display device 10, and FIG. 14B is a schematic plan view showing the light source, the polarization beam splitter and the half wavelength plate in FIG. 14A. As shown in FIG. 14A, the liquid crystal display device 10 comprises a light source 91, a polarization beam splitter 92, and a half wavelength plate 93. The polarization beam splitter 92 and the half wavelength plate 93 configure the polarization conversion element for aligning the polarization components of the light that is output from the light source 91. The configuration of FIG. 14A differs from the configuration in FIG. 13A in that a light guide bar is not used.

The light source 91 is a non-polarizing light source using an LED, SLD or the like, includes a collimator not shown, and outputs parallel light. A plurality of light sources 91 are provided in a predetermined spacing so that uniform light can be entered into the side surface 16a of the light guide plate 16. As shown in FIG. 14B, the polarization beam splitter 92 is provided along the side surface 16a of the light guide plate 16, and includes PBS surfaces 92a formed at positions where light that is output from the respective light sources 91 will fall incident. Each PBS surface 92a transmits one polarization component (for example, P polarization component) of the light that was output from the light source 91 while reflecting the other polarization component (for example, S polarization component). Moreover, the polarization beam splitter 92 includes mirror surfaces 92b which respectively reflect the light of the S polarization component that was reflected off the respective PBS surfaces 92a. The respective mirror surfaces 92b have the function of deflecting light of the S polarization component in a direction that is approximately the same as the advancing direction of the light of the P polarization component that passed through the PBS surface 92a.

The half wavelength plate 93 is provided to a position where the light of the S polarization component reflected off the respective mirror surfaces 92b will fall incident, and functions as the polarization conversion prism for rotating the polarization of the light of the S polarization component by 90 degrees. The light of the S polarization component in the half wavelength plate 93 becomes the P polarization by being rotated 90 degrees. Thus, light that passed through the respective PBS surfaces 92a and was output from the polarization beam splitter 92 and light that was output from the respective half wavelength plates 93 will both be of state where the polarization direction is aligned as the P polarization. The polarization beam splitter 92 and the half wavelength plate 93 function as the polarization element that is provided in the light path between the light source 91 and the light guide plate 16 and which improves the extinction ratio of the light that enters the light guide plate 16.

Light (P polarization in this example) that was output from the polarization beam splitter 92 and the respective half wavelength plates 93 and having an aligned polarization direction will enter the light guide plate 16 in a state where the incidence angle is 2 degrees or less; that is, in an approximately parallel state relative to the side surface 16a. Since the operation after the light enters the light guide plate 16 is the same as the configuration shown in FIG. 1A, the explanation thereof is omitted.

Note that, if there is slight birefringence in the light guide plate 16, the extinction ratio will deteriorate while the light propagates in the light guide plate 16 even if the extinction ratio of the incoming light is increased before entering the light guide plate 16. In the foregoing case, the characteristics of the polarizing plate 18b or a substitute polarization element are adjusted locally to achieve a uniform contrast in the plane. Specifically, the characteristics of the polarizing plate 18b are configured so that the polarization degree is increased as it withdraws from the incident side of the light guide plate 16. Based on this kind of configuration, a high contrast liquid crystal display device can be provided even if there is birefringence.

Second Embodiment

Figure 6A:
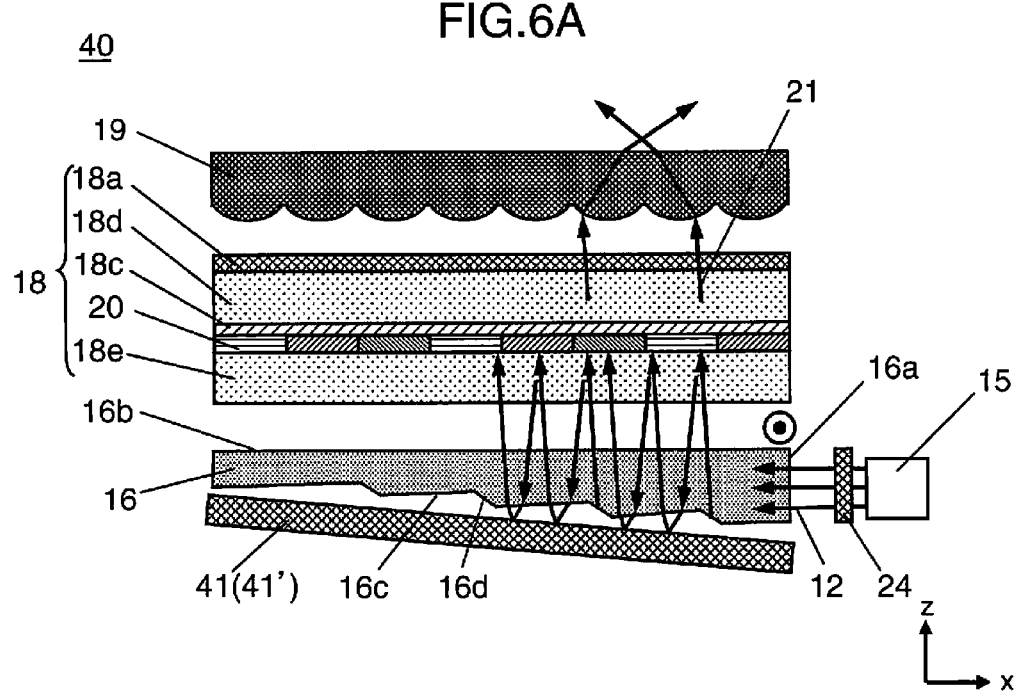
FIG. 6A is a cross section showing the schematic configuration of the essential part in the liquid crystal display device according to another embodiment of the present invention.
Figure 6B:
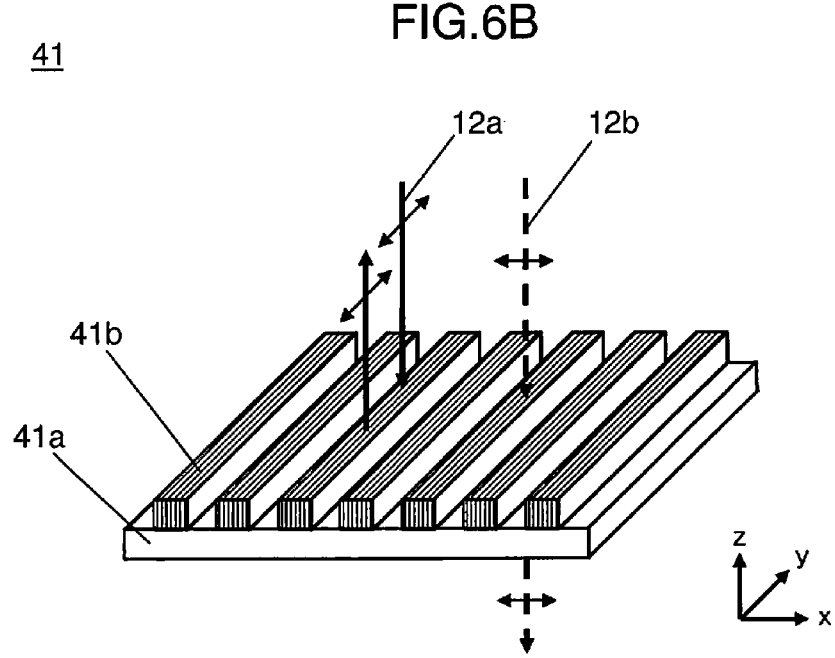
FIG. 6B is an enlarged view showing the schematic configuration of the wire grid polarizing plate in FIG. 6A.

FIG. 6A and FIG. 6B are schematic configuration diagrams showing the liquid crystal display device 40 according to the second embodiment of the present invention, wherein FIG. 6A is a cross section of the essential part of the liquid crystal display device 40, and FIG. 6B shows an enlarged view of the wire grid polarizing plate 41 in FIG. 6A.

The configuration of FIG. 6A differs from the configuration of FIG. 4 only in that the polarizing plate on the backlight unit side of the liquid crystal panel 18 is eliminated and that a wire grid polarizing plate 41 (polarization separation part) is disposed in substitute for the reflective sheet. Since the other constituent elements are the same, these are given the same reference numeral and the explanation thereof is omitted. However, the polarization direction of the laser beam 12 (illuminating light) that enters the light guide plate 16 and the liquid crystal panel 18 is different from the first embodiment, and is configured to become the polarization in the y-axis direction in FIG. 6A.

As shown in FIG. 6B, the wire grid polarizing plate 41 is configured by the fine grating 41b made of metal such as aluminum being formed in a specific pitch on the surface of the resin film substrate 41a.

The pitch of the fine grating 41b is configured as a pitch that is sufficiently small in comparison to the visible incoming light having a wavelength of 400 nm to 800 nm; for example, ½ or less of the foregoing wavelength, and in this embodiment the fine grating 41b is formed along the y-axis direction.

Consequently, the wire grid polarizing plate 41 is configured to function as a reflective polarizing plate that reflects most of the light of the polarization component (first deflection component) in the y-axis direction that is parallel to the grating direction of the fine grating 41b, and transmits most of the light of the polarization component (second deflection component) in the x-axis direction that is perpendicular to the grating direction of the fine grating 41b.

With the liquid crystal display device 40 configured as described above, although not shown in the diagrams, as with the first embodiment, the R light, the G light and the B light output as the same polarization direction from the R light source, the G light source and the B light source are collimated for each light source, condensed as the laser beam 12 by the dichroic mirror and enters the light guide bar 15, and a uniform laser beam 12 with polarization that is aligned is output from the light guide bar 15. The extinction ratio of the laser beam 12 further increases as a result of passing through the polarization element 24, and the laser beam 12 enters the light guide plate 16 in a state where the incidence angle is 2 degrees or less; that is, in an approximately parallel state relative to the side surface 16a.

Here, if the polarization direction of the laser beam 12 that entered the light guide plate 16 is the y-axis direction, the laser beam 12 that entered the light guide plate 16 is totally reflected with the defected surface 16d formed on the opposing surface 16c and then deflected toward the principal surface 16b, output from the principal surface 16b to the principal surface 16b approximately perpendicularly while maintaining the polarization of the y-axis direction, enters then the liquid crystal panel 18 while maintaining a high extinction ratio, and then arrives at the reflective color filter 20.

With the laser beam 12 that arrived at the reflective color filter 20, only predetermined light that entered the predetermined filter region is transmitted and output as the outgoing beam 21 from the reflective color filter 20, and the remaining light is reflected off the reflective color filter 20. The laser beam 12 that was reflected off the reflective color filter 20 returns from the liquid crystal panel 18 to the light guide plate 16, passes through the light guide plate 16, and then enters the wire grid polarizing plate 41.

Here, of the laser beam 12, the polarization component 12a in the y-axis direction (first polarization component that is required for image display in the liquid crystal panel 18) is reflected off the wire grid polarizing plate 41, while the polarization component 12b in the x-axis direction (second polarization component that is unwanted in the image display) is transmitted through the wire grid polarizing plate 41. The laser beam 12 that was reflected off the wire grid polarizing plate 41 passes through the light guide plate 16 once again and enters the liquid crystal panel 18, and, similarly, only predetermined light that entered the predetermined filter region of the reflective color filter 20 is transmitted, and the remaining light is reflected off the reflective color filter 20. The polarization component 12a in the y-axis direction of the laser beam 12 repeats the foregoing recycle process, ultimately enters the corresponding filter region, and is output as the outgoing beam 21 from the reflective color filter 20. Here, although the polarization may rotate during the recycle process, since the polarization component 12b as the unwanted polarization component passes through the wire grid polarizing plate 41 and is eliminated, light with a high extinction ratio will constantly enter the reflective color filter 20.

The polarization direction of the outgoing beam 21 that was subject to wavelength separation and which passed through the reflective color filter 20 is modulated at the liquid crystal layer 18c as with the first embodiment, and, since only the predetermined polarization component is output with the polarizing plate 18a, it is subject to brilliance modulation for each sub-pixel and then output from the liquid crystal panel 18, diffused with the cross lenticular lens 19, and a bright image with a wide view angle is thereby displayed.

As explained above, the liquid crystal display device 40 of the second embodiment is able to efficiently guide the R light, the G light, and the B light to the respective sub-pixels while recycling the laser beam 12 and prevent the loss of light quantity and deterioration in the extinction ratio during the recycle process as with the first embodiment. Thus, it is possible to realize a high contrast and thin liquid crystal display device of extremely low power consumption.

Moreover, by realizing the function of polarization separation with the wire grid polarizing plate 41 disposed in substitute for a reflective sheet, it is possible to reduce the number of parts and lower the cost by eliminating the polarizing plate on the backlight side of the liquid crystal panel 18.

Here, the wire grid polarizing plate 41 is manufactured, for example, by using nano imprint technology. However, since the roll-to-roll manufacturing technology can be adopted by treating the surface of the resin film, mass production is enabled at low cost. Moreover, since the wire grid polarizing plate 41 is light and can be easily processed for cutting and the like, the assembly process is basically the same in comparison to a reflective sheet. Accordingly, it is possible to realize a liquid crystal display device with favorable mass productivity.

Note that the wire grid polarizing plate 41 may also be prepared based on other methods such as etching or the like, and it goes without saying that the effect of this embodiment can be obtained without having to depend on the manufacturing method.

Moreover, although this embodiment is configured to improve the extinction ratio with the polarization element 24 immediately before the laser beam 12 enters the light guide plate 16, it may also be configured such as the deflected surface disposed on the opposing surface of the light guide plate functions as the polarization separation part.

Figure 7A:
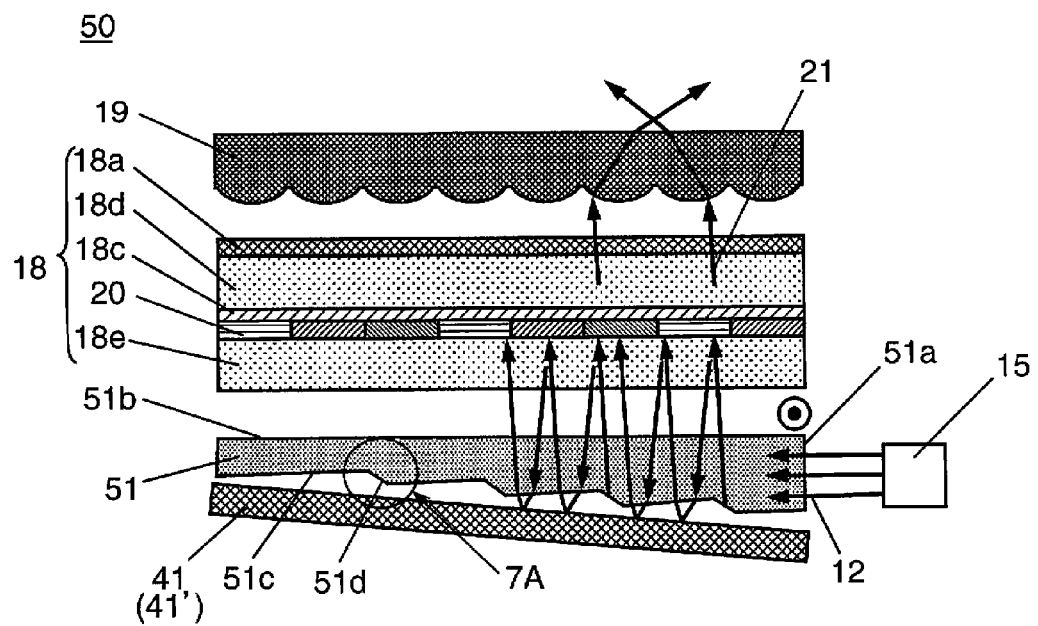
FIG. 7A is a cross section showing the schematic configuration of the essential part of another liquid crystal display device according to another embodiment of the present invention.
Figure 7B:
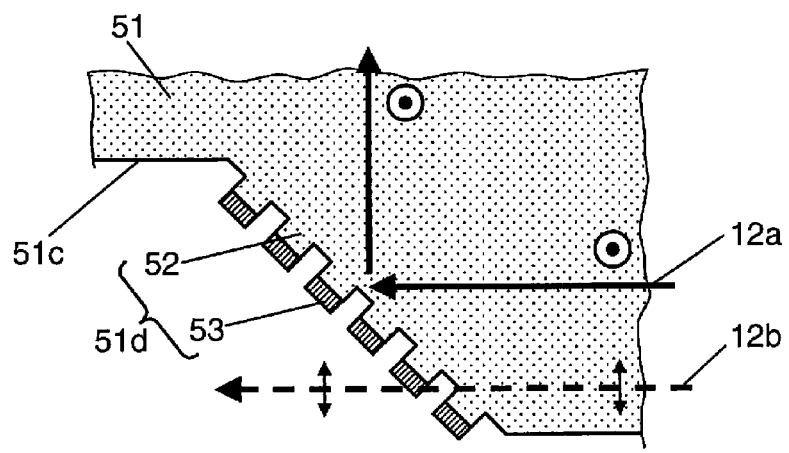
FIG. 7B is a cross section showing the schematic configuration of the 7A part in FIG. 7A.

FIG. 7A and FIG. 7B are schematic configuration diagrams showing another embodiment of the liquid crystal display device according to the second embodiment of the present invention, wherein FIG. 7A is a cross section of the essential part of the liquid crystal display device 50, and FIG. 7B shows an enlarged view of the 7A part in FIG. 7A.

The configuration of FIG. 7A differs from the configuration of FIG. 6A only in that the polarization element 24 is eliminated and a light guide plate 51 is used in substitute for the light guide plate 16, and, since the other constituent elements are the same, the same reference numeral is given and the explanation thereof is omitted.

Here, the light guide plate 51 includes an opposing surface 51c and a deflected surface 51d on a surface facing the principal surface 51b as shown in FIG. 7A. Moreover, as shown in FIG. 7B, the deflected surface 51d is formed with a fine grating 52, and a high refractive index layer 53 is formed on the tip of the fine grating 52.

The fine grating 52 is configured so that the Λ (cos θ) will be smaller than the wavelength of the incoming laser beam 12 when the cycle is defined as Λ and the incidence angle is defined as θ, and the high refractive index layer 53 is configured from a material having a large refractive index that is at least 0.65 or more than the refractive index of the portions other than the high refractive index layer 53 in the light guide plate 51. For example, acrylic having a refractive index of approximately 1.49 may be used the portions other than the high refractive index layer 53 in the light guide plate 51, and titanium oxide having a refractive index of approximately 2.4 may be used as the high refractive index layer 53.

According to this kind of configuration, for example, as described in International Publication No. WO 2007/077652, since it is possible to reflect the TE polarization (s polarization) and transmit the TM polarization (p polarization), of the laser beam 12 that entered the light guide plate 51, it is possible to deflect only the polarization component 12a that is required for the image display of the liquid crystal panel 18 and cause it to enter the liquid crystal panel 18.

Accordingly, when adopting this kind of configuration, the polarization element for improving the extinction ratio before causing the light to enter the light guide plate 51 is no longer required, and the number of parts can thereby be reduced. Moreover, if the distance from the side surface to which the laser beam 12 falls incident to the deflected surface is long, there is a possibility that the polarization will rotate during that time causing the extinction ratio to deteriorate. However, if the deflected surface 51d of the light guide plate 51 is caused to function as the polarization separation part as shown with the configuration of FIG. 7A and FIG. 7B, it is possible to output a laser beam 12 with a high extinction ration from the overall principal surface 51b, and a high quality image with a uniform and high contrast can be displayed even with a large screen.

In addition, the fine grating 52 to perform polarization separation can be formed integrally with the light guide plate 51. Thus, it can be manufactured with a simple process and yields superior mass productivity.

Note that, in this embodiment shown in FIG. 6A and FIG. 7A, the functions of polarization separation and recycle/reflection are realized with the wire grid polarizing plate 41. Nevertheless, the present invention is not limited to the foregoing configuration, and a similar effect can be yielded by using, in substitute for the wire grid polarizing plate 41, a polarized reflection sheet 41' formed by laminating a dielectric film with anisotropy of a refractive index and configured to transmit light of a polarization component in a specific direction (second deflection component that is unwanted in the image display) while reflecting light of a polarization component that is orthogonal thereto (first deflection component that is required for image display in the liquid crystal panel 18). Moreover, according to this configuration, since the reflectance of the polarization component 12a can be further increased, it is possible to further reduce the light quantity that is lost during the recycle process, and realize an even lower power consumption liquid crystal display device.

Figure 8A:
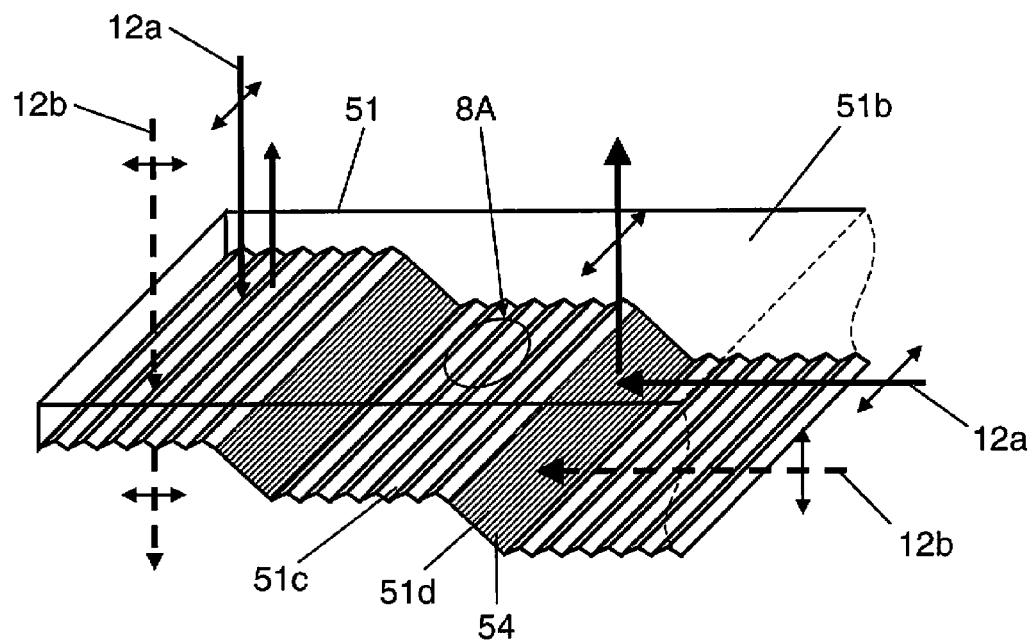
FIG. 8A is a perspective view showing the schematic configuration of another light guide plate in FIG. 7A.
Figure 8B:
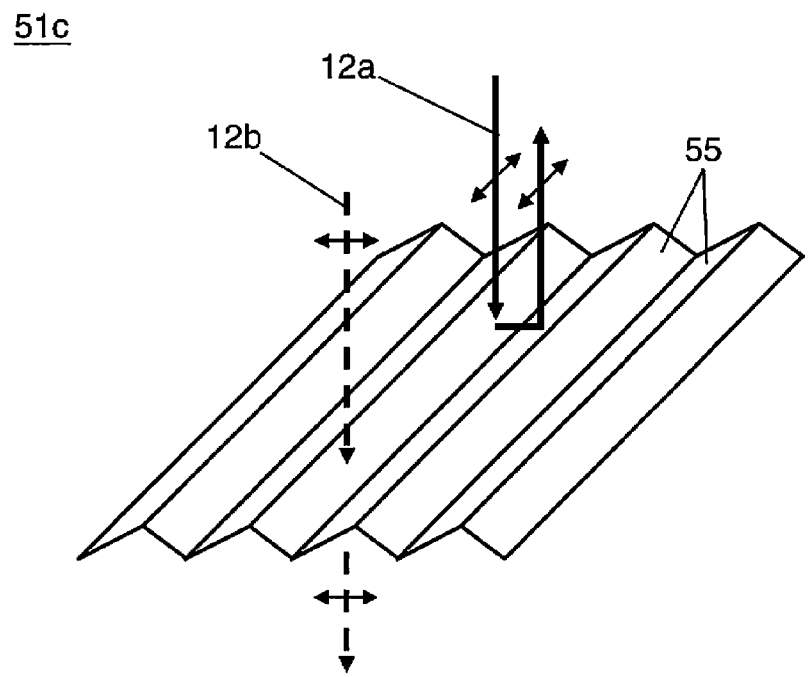
FIG. 8B is an enlarged view showing the schematic configuration of the 8A part in FIG. 8A.

Moreover, in the configuration shown in FIG. 7B, a polarization separation film made of a dielectric multi-layered film may be formed on the polarization plane 51d in substitute for the fine grating 52. FIG. 8A and FIG. 8B are schematic configuration diagrams showing another embodiment of the light guide plate of the embodiment shown in FIG. 7B, wherein FIG. 8A is a schematic perspective view of the light guide plate, and FIG. 8B shows an enlarged view of the 8A part of FIG. 8A.

In FIG. 8A, the deflected surface 51d is formed with a polarization separation film 54 that transmits the P polarization while reflecting the S polarization. Moreover, the opposing surface 51c is also formed with a V-shaped inclined plane of approximately 45 degrees relative to the principal surface 51b, and the respective inclined planes are formed with a polarization reflective film 55 made of a dielectric multi-layered film that transmits the P polarization (light of the second deflection component) while reflecting the S polarization (light of the first deflection component).

As shown in FIG. 8A, when light of the S polarization component (polarization component 12a) enters the polarization plane 51d formed with the polarization separation film, it is deflected approximately 90 degrees, and is output from the light guide plate 51 to the principal surface 51d approximately perpendicularly. Meanwhile, light of the P polarization component (polarization component 12b) that enters the deflected surface 51d is transmitted through the deflected surface 51d, and is output from the back surface of the light guide plate 51. Here, since the deflected surface 51d can be formed with a polarization separation film 54 made of a dielectric multi-layered film having high P polarization transmittance and high S polarization reflectance, illuminating light with a high extinction ratio can be uniformly output from the light guide plate 51.

Moreover, as shown in FIG. 8B, light of the S polarization component (polarization component 12a) that enters one inclined plane of the V-shaped grooves formed on the opposing surface 51c of the light guide plate 51 from a direction that is approximately perpendicular to the principal surface 51b is reflected off the polarization reflective film 55 formed on the inclined plane and deflected approximately 90 degrees, enters the other inclined plane and is deflected approximately 90 degrees once again, and returns to the principal surface 51b in an approximately perpendicular direction. Meanwhile, light of the P-polarized component (polarization component 12b) that entered similarly is transmitted through the V-shaped grooves and separated from the light of the S polarization component. Since only the required polarization component 12a can be reflected while separating the polarization with the opposing surface 51c of the light guide plate 51, it is possible to eliminate the wire grid polarizing plate 41 and thereby realize a liquid crystal display device at an even lower cost.

Third Embodiment

Figure 9A:
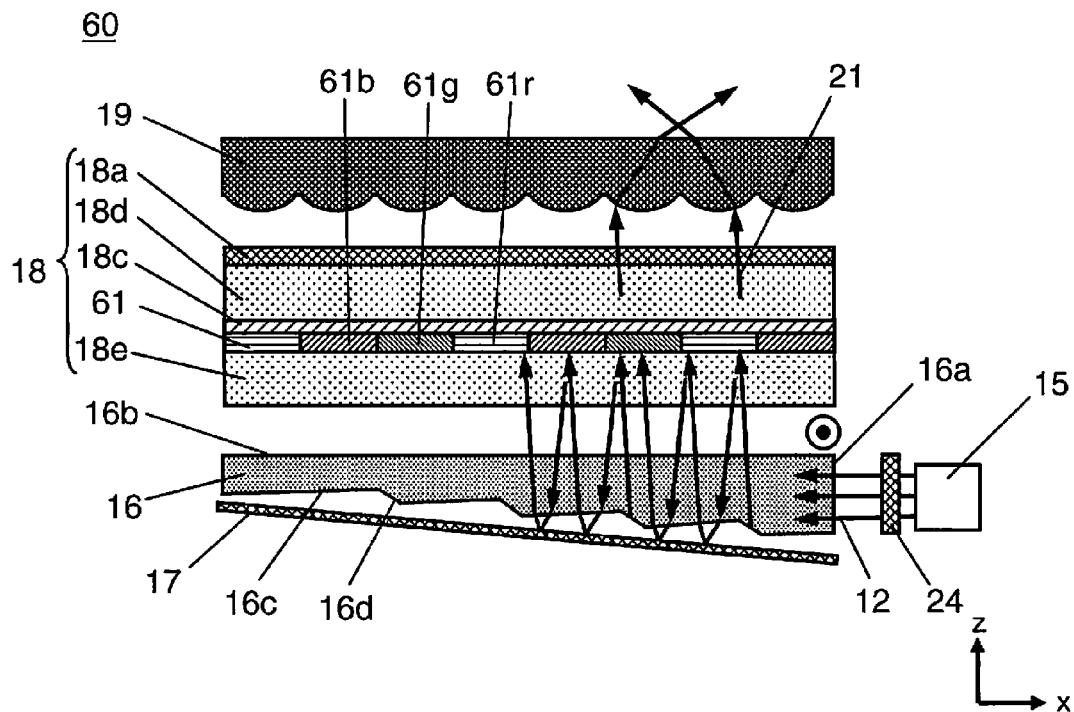
FIG. 9A is a cross section showing the schematic configuration of the essential part in the liquid crystal display device according to another embodiment of the present invention.
Figure 9B:
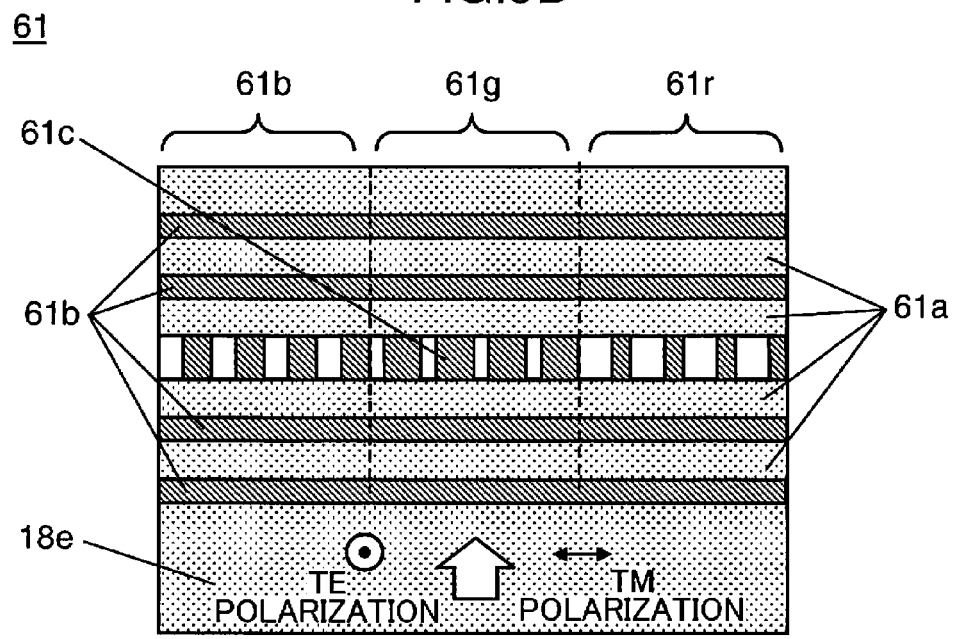
FIG. 9B is a schematic diagram showing the film structure of the reflective color filter in FIG. 9A.

FIG. 9A and FIG. 9B are schematic configuration diagrams showing the liquid crystal display device according to the third embodiment of the present invention, wherein FIG. 9A is a cross section of the essential part of the liquid crystal display device 60, and FIG. 9B is a schematic diagram showing the film structure of the reflective color filter 61 in FIG. 9A.

The configuration of FIG. 9A differs from the configuration of FIG. 1A only in that the polarizing plate on the backlight unit side of the liquid crystal panel 18 is eliminated and the polarization element 24 is disposed adjacent to the side surface 16a of the light guide plate 16, and the structure of the reflective color filter has been changed. Since the other constituent elements are the same, these are given the same reference numeral and the explanation thereof is omitted. Note that the polarization direction of the laser beam 12 that enters the light guide plate 16 and the liquid crystal panel 18 is different from the first embodiment, and is configured to become the polarization in the y-axis direction in FIG. 9A.

As shown in FIG. 9B, the reflective color filter 61 is configured by laminating a low refractive index layer 61a configured from a low refractive index material (for example, silicon dioxide ($SiO_2$)), a high refractive index layer 61b configured from a high refractive index material (for example, titanium dioxide ($TiO_2$)), and a defect layer 61c configured from fine grating of a periodic structure that is finer than the wavelength of the incoming light. The fine grating of the defect layer 61c can be formed from a high refractive index material (for example, titanium dioxide ($TiO_2$)). Here, the thickness of the respective layers; namely, the low refractive index layer 61a and the high refractive index layer 61b is configured so that the optical film thickness that is obtained by multiplying the physical film thickness by the refractive index becomes approximately equal to ¼ of the set wavelength (for example, 535 nm), and configured to be the same film thickness in the respective regions 61r, 61g, 61b.

The fine grating of a periodic structure in the defect layer 61c has a structure in which the grating part and the space part (air space) are periodically repeated, and the direction of forming the fine grating is a direction that is approximately perpendicular to the surface (principal surface) of the reflective color filter 61. Moreover, the defect layer 61c is configured to have a different effective refractive index for each region by changing the duty ratio of the fine grating (thickness ratio of the grating part and the space part). Consequently, the optical film thickness of the defect layer 61c is changed for each region, the respective regions transmit one of the lights; namely, the R light, the G light or the B light, and reflect the remaining light. Specifically, in the reflective color filter 61, the region 61r transmits the R light while reflecting the G light and the B light, the region 61g transmits the G light while reflecting the R light and the B light, and the region 61b transmits the B light while reflecting the R light and the G light. Moreover, as a result of configuring the defect layer 61c with fine grating, the spectroscopic properties of the reflective color filter 61 are caused to change relative to the polarization in a direction along the grating (hereinafter referred to as the "TE polarization) and the polarization that is orthogonal thereto (hereinafter referred to as the "TM polarization).

Figure 10:
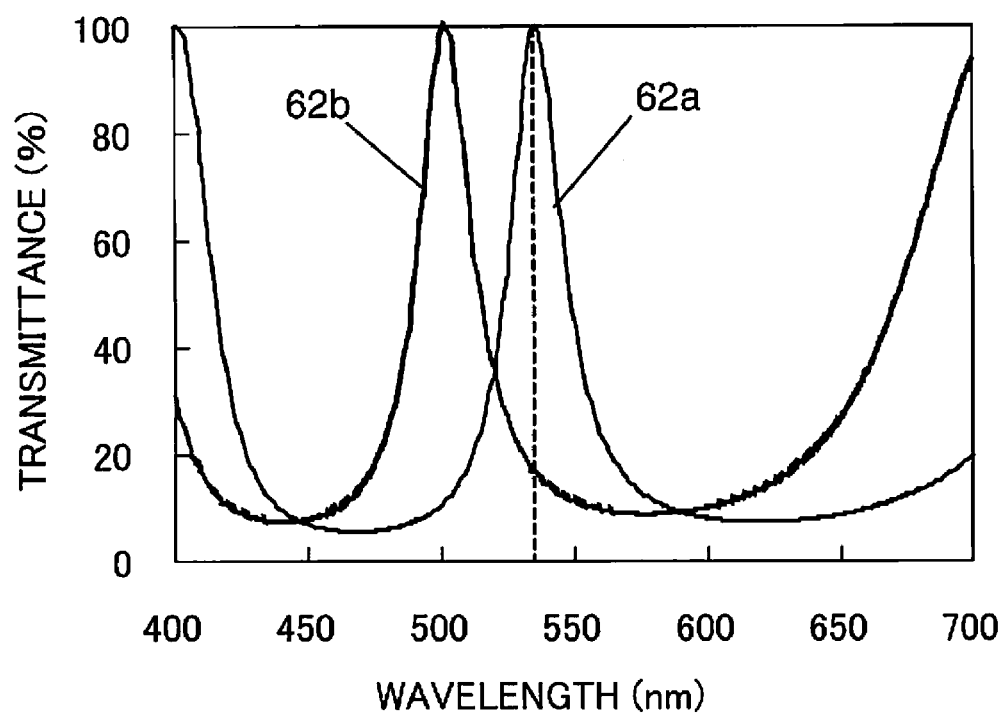
FIG. 10 is a characteristics diagram showing the spectroscopic properties of the region 61g of the reflective color filter shown in FIG. 9B.

FIG. 10 is a characteristics diagram showing the spectroscopic properties of the region 61g of the reflective color filter 61, wherein the horizontal axis shows the wavelength (nm) and the vertical axis shows the transmittance (%). Moreover, the spectroscopic properties 62a show the characteristics relative to the TE polarization, and the spectroscopic properties 62b show the characteristics relative to the TM polarization. As shown in FIG. 10, the reflective color filter 61 has different spectroscopic properties relative to the TE polarization and the TM polarization, and, for example, if light (G light) having a wavelength shown with the wavy line in the region 61g enters as the TE polarization, roughly 100% will be transmitted. Meanwhile, if it enters as the TM polarization, 20% will be transmitted and the remainder will be reflected.

Note that by increasing the refractive index of the fine grating of the defect layer 61c, the difference in the peak wavelength of transmittance between the spectroscopic properties 62a and 62b can be broadened. In addition, by devising the film structure such as by increasing the number of layers of the multi-layered film of the reflective color filter 61, it is possible to further reduce the transmittance of the G light in the spectroscopic properties 62b. Specifically, for example, the configuration may also be such that the TE polarization is basically transmitted and the TM polarization is basically reflected relative to the G light. These characteristics can be effectively yielded by using a laser beam having a narrow wavelength interval.

With the liquid crystal display device 60 configured as described above, although not shown in the diagrams, as with the first embodiment, the R light, the G light and the B light output as the same polarization direction from the R light source, the G light source and the B light source are collimated for each light source, condensed as the laser beam 12 by the dichroic mirror and enters the light guide bar 15, and a uniform laser beam 12 with polarization that is aligned in the y-axis direction is output from the light guide bar 15. The extinction ratio of the laser beam 12 further increases as a result of passing through the polarization element 24, and the laser beam 12 enters the light guide plate 16 in a state where the incidence angle is 2 degrees or less; that is, in an approximately parallel state relative to the side surface 16a.

The laser beam 12 that entered the light guide plate 16 is totally reflected with the defected surface 16d formed on the opposing surface 16c and then deflected toward the principal surface 16*b*, output from the principal surface 16*b* to the principal surface 16*b* approximately perpendicularly, enters then the liquid crystal panel 18 while maintaining a high extinction ratio as the polarization in the y-axis direction, and then arrives at the reflective color filter 61.

Here, the laser beam 12 enters the reflective color filter 61 as the TE polarization, only predetermined light that entered the predetermined filter region is transmitted and output as the outgoing beam 21 from the reflective color filter 61, and the remaining light is reflected off the reflective color filter 61. Here, since most of the TM polarization component that is slightly included in the laser beam 12 will be reflected, the extinction ratio of the outgoing beam 21 will increase even further.

The laser beam 12 that was reflected off the reflective color filter 61 returns from the liquid crystal panel 18 to the light guide plate 16, passes through the light guide plate 16 and is reflected off the reflective sheet 17, once again passes through the light guide plate 16 and enters the liquid crystal panel 18, and once again enters the reflective color filter 61. Here, the polarization component 12*a* in the y-axis direction of the laser beam 12 (first polarization component that is required for image display in the liquid crystal panel 18) is repeatedly recycled as described above, ultimately enters the corresponding filter region, and is output as the outgoing beam 21.

Moreover, the polarization component 12*b* as the second polarization component which is unwanted in the image display is repeatedly reflected between the reflective color filter 61 and the reflective sheet 17, the polarization of a part thereof is rotated and becomes the polarization component 12*a* (that is, the unwanted polarization component can also be recycled), and the remainder is ultimately output from the side surface of the like of the light guide plate 16 and absorbed by the case, cover or the like not shown.

The polarization direction of the outgoing beam 21 that was subject to wavelength separation and which passed through the reflective color filter 61 is modulated at the liquid crystal layer 18*c* as with the first embodiment, and, since only the predetermined polarization component is output with the polarizing plate 18*a*, it is subject to brilliance modulation for each sub-pixel and then output from the liquid crystal panel 18, diffused with the cross lenticular lens 19, and a bright image with a wide view angle is thereby displayed.

As explained above, the liquid crystal display device 60 of the third embodiment is able to efficiently guide the R light, the G light, and the B light to the respective sub-pixels while recycling the laser beam 12 and prevent the loss of light quantity and deterioration in the extinction ratio during the recycle process as with the first embodiment. Thus, it is possible to realize a high contrast and thin liquid crystal display device of extremely low power consumption.

Moreover, by realizing the function of polarization separation with the reflective color filter 61, it is possible to reduce the number of parts by eliminating the polarizing plate on the backlight side of the liquid crystal panel 18. Moreover, as a result of being able to also recycle the unwanted polarization component, the efficiency is further improved. It is thereby possible to realize a low power consumption liquid crystal display device at an even lower cost.

Here, since the fine grating of the defect layer 61*c* of the reflective color filter 61 can be prepared inexpensively and with high throughput by employing a manufacturing method (nano imprint) of pressing a mold (casting mold) with fine unevenness of a nanoscale (nm scale) against the material to be processed, it can be manufactured at a lower cost than the structure of changing the film thickness for each region via etching or the like, and the mass productivity is also high.

In addition, since the film thickness of each region is uniform and smooth, when adopting the configuration of forming a transparent electrode or TFT on the reflective color filter 61, it is not necessary to perform smoothing treatment to the top surface of the reflective color filter 61.

Figure 11A:
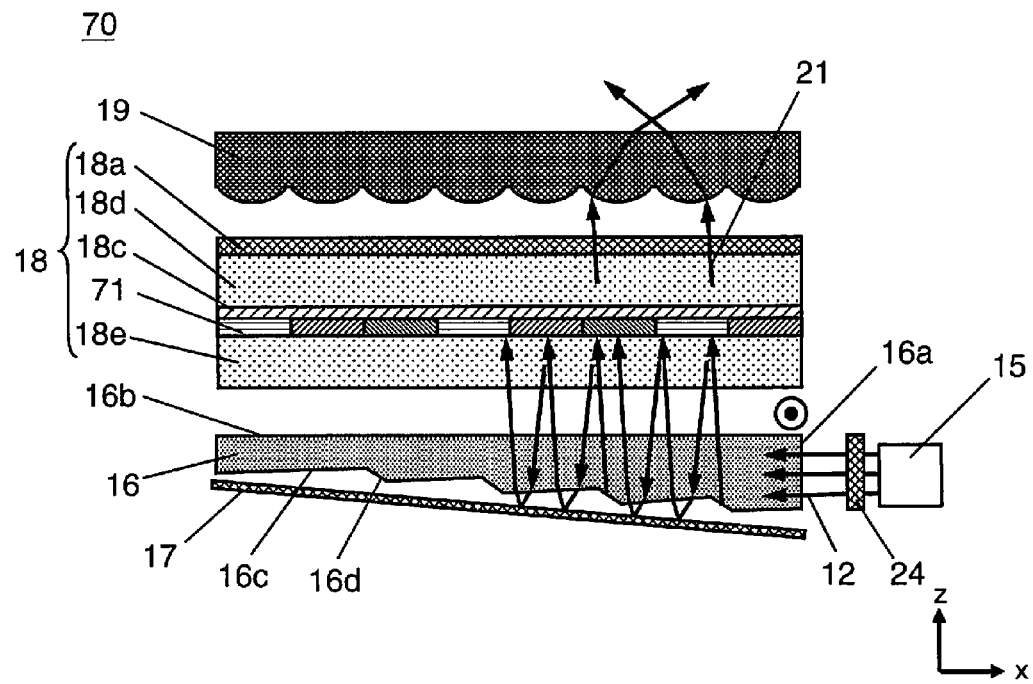
FIG. 11A is a cross section showing the schematic configuration of the essential part in the liquid crystal display device according to yet another embodiment of the present invention.
Figure 11B:
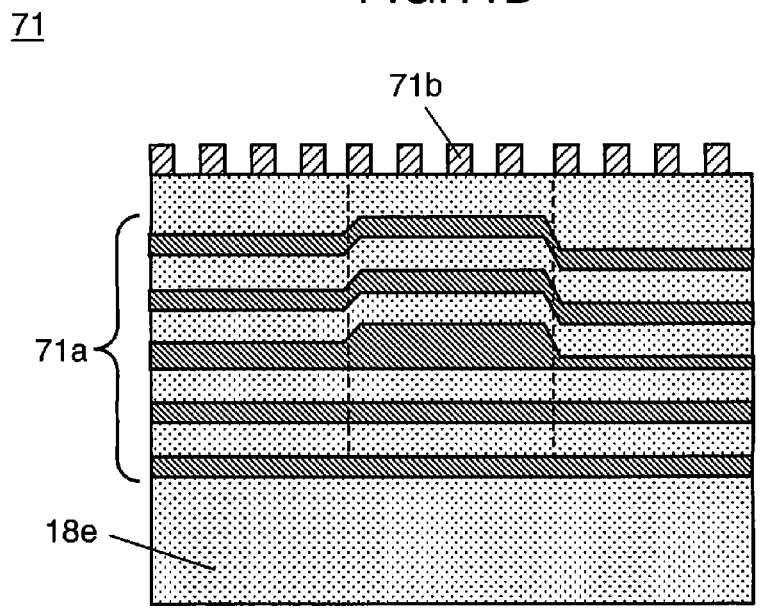
FIG. 11B is a schematic diagram showing the film structure of the reflective color filter in FIG. 11A.

Note that, in this embodiment, although the reflective color filter 61 was configured to also function as the polarization separation part, a layer possessing a polarization separation function may also be inserted between the reflective color filter and the liquid crystal layer 18*c*. FIG. 11A and FIG. 11B are schematic configuration diagrams showing another liquid crystal display device according to the third embodiment of the present invention, wherein FIG. 11A is a cross section of the essential part of the liquid crystal display device 70, and FIG. 11B is a schematic diagram showing the film structure of the reflective color filter 71 in FIG. 11A. The configuration of FIG. 11A differs from the configuration of FIG. 9A only with respect to the reflective color filter 71, and, since the other constituent elements are the same, the same reference numeral is given and the explanation thereof is omitted.

As shown in FIG. 11B, the reflective color filter 71 has a color filter part 71*a* having the same structure as the reflective color filter 20 shown in the first embodiment formed on the glass substrate 18*e*, and a wire grid polarizing plate 71*b* is formed thereon.

Even with this kind of configuration, it is possible to transmit only the light having a predetermined wavelength that entered a predetermined region among the R light, the G light, and the B light that entered the reflective color filter 71, and reflect and recycle the remaining light, and since it is also possible to recycle the unwanted polarization component by reflecting it with the wire grid polarizing plate 71*b*, it is possible to obtain extremely high light utilization efficiency.

Moreover, since the foregoing configuration is able to realize an even higher polarization degree in the wire grid polarizing plate 71*b*, it is possible to further increase the extinction ratio of the outgoing beam 21 that passes through the reflective color filter 71, and realize an even higher contrast. Otherwise, since a high contrast can be realized even if the polarization element 24 is eliminated, it is possible to lower the costs.

Note that the configurations shown in the first to third embodiments of the present invention are merely examples, and this invention can be worked in various modifications so as long as it does not deviate from the gist of this invention. In addition, it goes without saying that all configurations may be freely combined, and the respective combinations will exhibit effects that are unique to this invention.

As described above, the liquid crystal display device according to one aspect of the present invention has: a light source; a light guide plate for causing light from the light source to enter from a side surface and exit as illuminating light from one principal surface; a liquid crystal panel which includes a reflective color filter having wavelength selectivity in transmittance and reflectance and a polarizing plate disposed on a side closer to the light guide plate than the reflective color filter, and which is disposed on a light path of the illuminating light; and a recycle part for reflecting the illuminating light reflected with the reflective color filter toward the reflective color filter once again, wherein the light from the light source is configured to enter the light guide plate as approximately linear polarization, and wherein the polarizing plate of the liquid crystal panel is configured to exhibit transmittance of 90% or higher.

According to the foregoing configuration, light from the light source is output as illuminating light from one principal surface of the light guide plate and enters the liquid crystal panel. The liquid crystal panel is provided with a reflective color filter having wavelength selectivity in transmittance and reflectance, and the illuminating light that entered the corresponding sub-pixels is transmitted through the reflective color filter and the remaining illuminating light can be reflected with the reflective color filter and reused. Specifically, the illuminating light that reflected off the reflective color filter is reflected with the recycle part and will head toward the reflective color filter once again. As described above, the illuminating light is configured to perform a recycle operation of repeatedly being reflected between the reflective color filter and the recycle part until it enters the corresponding sub-pixels and is transmitted through the reflective color filter. Since a polarizing plate that is disposed on a side that is closer to the light guide plate side than the reflective color filter exists in the light path between the reflective color filter and the recycle part, the illuminating light will pass through the polarizing plate numerous times during the foregoing recycle operation. Thus, the transmittance of the polarizing plate will largely affect the light utilization efficiency of the illuminating light to be recycled.

Under normal circumstances, the transmittance of a standard polarizing plate is approximately 80 to 85%. However with the foregoing configuration, since the light quantity loss is inhibited while the illuminating light is repeatedly transmitted through the polarizing plate, the transmittance of the polarizing plate is 90% or higher. As described above, since the transmittance of the polarizing plate existing in the light path through which the illuminating light to be reused is repeatedly transmitted is set to be higher than a conventional configuration, it is possible to inhibit the light quantity loss of the light to be reused and efficiently guide it to the corresponding sub-pixels. It is thereby possible to realize liquid crystal display device of extremely low power consumption. Moreover, since light from the light source is caused to enter the light guide plate as linear polarization, the contrast will not deteriorate even if the polarization degree of the polarizing plate is reduced and the transmittance is increased, and it is possible to additionally realize high quality image display.

In the foregoing configuration, it is preferable to further comprise a polarization element for improving an extinction ratio of light entering the light guide plate in a light path between the light source and the light guide plate.

In the foregoing case, since the extinction of light to enter the light guide plate is high, deterioration in contrast caused by an insufficient extinction ratio will not occur even if the polarization degree of the polarization plate disposed between the reflective color filter and the recycle part is additionally lowered. It is thereby possible to reduce the polarization degree of the polarizing plate and further increase the transmittance, and realize a high contrast liquid crystal display device of low power consumption.

In the foregoing configuration, preferably, the polarization element is a polarization conversion element including a polarization beam splitter and a half wavelength plate for rotating polarization of one light split by the polarization beam splitter by 90 degrees.

According to the foregoing configuration, the polarization direction can be aligned with the polarization conversion element including the polarization beam splitter and the half wavelength plate. Thus, even if a non-polarizing light source such as a light-emitting diode (LED) or a super luminescent diode (SLD) is used, the light can be configured to enter the light guide plate as approximately linear polarization. Thus, since a low interference light such as an LED or SLD can be used, it is possible to inhibit the influence of speckle noise and further improve the image quality.

Moreover, preferably, the liquid crystal panel includes a liquid crystal layer for modulating polarization of the illuminating light, and a transparent electrode and a liquid crystal driving element for driving the liquid crystal layer, and the reflective color filter is disposed on a side that is closer to the light guide plate than the transparent electrode and the liquid crystal driving element.

In the foregoing case, since a transparent electrode and a liquid crystal driving element (for example, TFT or the like) are not disposed in the light path through which the light to be reused is repeatedly transmitted, it is possible to prevent the light quantity loss when the reused light is repeatedly transmitted through the transparent electrode and the liquid crystal driving element, and realize a liquid crystal display device of low power consumption.

In order to realize the foregoing configuration, the reflective color filter may be disposed on a side that is closer to the light guide plate than the liquid crystal layer, and the transparent electrode and the liquid crystal driving element may be disposed between the liquid crystal layer and the reflective color filter.

Otherwise, the reflective color filter may be disposed on a side that is closer to the light guide plate than the liquid crystal layer, and the transparent electrode and the liquid crystal driving element may be disposed on a side that is opposite to the reflective color filter, with the liquid crystal layer interposed therebetween.

In the foregoing configuration, preferably, the reflective color filter includes polarization selectivity for selectively transmitting light of a first polarization component that is required for image display of the liquid crystal panel while selectively reflecting light of a second polarization component that is orthogonal to the first polarization component.

In the foregoing case, light of the second polarization component that is unwanted in the image display is repeatedly reflected between the reflective color filter and the recycle part and a part thereof becomes the first polarization component that is required for image display as a result of the polarization being rotated. Specifically, the unwanted second polarization component can also be reused, and it is possible to further improve the efficiency. It is thereby possible to realize a liquid crystal display device of still lower power consumption.

In the foregoing configuration, preferably, the reflective color filter includes a first layer made of a high refractive index material, a second layer made of a low refractive index material, and a defect layer made of fine grating having a cycle that is subwavelength, the reflective color filter being configured as a multi-layered film in which at least one of the first layer and the second layer is laminated on either side of the defect layer, and including a plurality of filter regions having different corresponding wavelengths, and the defect layer is configured so that the duty ratio of the fine grating differs for each of the plurality of filter regions.

In the foregoing case, since the effective refractive index of the defect layer will change for each filter region and spectroscopic properties can be set for each filter region, it will effectively function as a color filter. Moreover, since the reflective color filter will possess polarization anisotropy due to the fine grating, this is used to realize the polarization separation function. Based on the polarization separation function, it is possible to provide light with a high extinction ratio for the image display, and thereby display a high contrast, high quality image.

In the foregoing configuration, preferably, the first layer, the second layer and the defect layer of the reflective color filter are configured to be of the same film thickness in the plurality of filter regions.

In the foregoing case, smoothing treatment of the top surface of the reflective color filter is no longer required when forming the transparent electrode and the liquid crystal driving element (TFT or the like) on the reflective color filter.

In the foregoing configuration, it is preferable to further comprise a polarization separation part for separating light of a first polarization component that is required for image display of the liquid crystal panel from light of a second polarization component that is orthogonal to the first polarization component, and, preferably, the liquid crystal panel includes a liquid crystal layer for modulating polarization of the illuminating light, the reflective color filter is disposed on a side that is closer to the light guide plate than the liquid crystal layer, and the polarization separation part is disposed between the liquid crystal layer and the reflective color filter.

According to the foregoing configuration, based on the polarization separation function of separating light of the first polarization component that is required for image display of the liquid crystal panel from light of a second polarization component that is orthogonal to the first polarization component, it is possible to provide light with a high extinction ratio for the image display, and thereby display a high contrast, high quality image. In addition, since a polarization separation part is not disposed on the light path through which the illuminating light to be reused is repeatedly transmitted, it is possible to further improve the light utilization efficiency and realize a liquid crystal display device of low power consumption.

In the foregoing configuration, preferably, the polarization separation part is configured from a wire grid polarizing plate disposed on a top surface of the reflective color filter.

In the foregoing case, since a higher polarization degree can be realized in the wire grid polarizing plate, it is possible to further improve the extinction ratio of the outgoing beam that is transmitted through the reflective color filter, and realize an even higher contrast.

In the foregoing configuration, preferably, the recycle part separates light of a first polarization component that is required for image display of the liquid crystal panel among the light reflected by the reflective color filter from light of a second polarization component that is orthogonal to first polarization component and reflects the separated light toward the reflective color filter once again, the recycle part being configured to absorb the separated light of the second polarization component or cause the separated light to propagate in a direction that is different from a direction of the light of the first polarization component.

In the foregoing case, it is possible to efficiently guide light from the light source to the corresponding sub-pixels and inhibit the loss of light to be reused. Moreover, by causing the recycle part to function as the polarization separation part, the number of parts can be reduced, and it is possible to reduce costs.

In the foregoing configuration, preferably, the recycle part is configured from a wire grid polarizing plate that is disposed adjacent to an opposing surface facing the principal surface of the light guide plate.

In the foregoing case, since mass production of the wire grid polarizing plate is possible at low cost with, for example, roll-to-roll manufacturing technology, and because the processes of cutting and the like are also easy, it is possible to realize a liquid crystal display device with favorable mass productivity.

In the foregoing configuration, preferably, the recycle part is configured from a polarized reflection sheet which is formed by laminating a dielectric film having anisotropy of a refractive index, and which reflects the light of the first polarization component while transmitting the light of the second polarization component, the recycle part being disposed adjacent to an opposing surface facing the principal surface of the light guide plate.

In the foregoing case, since an even higher polarization reflectance can be realized, it is possible to further reduce the light quantity that is lost while repeating the reflection between the reflective color filter and the recycle part, and thereby realize an even lower power consumption liquid crystal display device.

In the foregoing configuration, preferably, the light guide plate is formed with a plurality of V-shaped grooves having an inclination of approximately 45 degrees relative to the principal surface on an opposing surface facing the principal surface, and the recycle part is configured by forming, on an inclined plane of the V-shaped grooves, a dielectric multi-layered film which transmits the light of the second polarization component while reflecting the light of the first polarization component.

In the foregoing case, when light enters one inclined plane of the V-shaped grooves formed on the opposing surface of the light guide plate from a direction that is approximately perpendicular to the principal surface, light of the first polarization component (for example, the S polarization component) is deflected with the inclined plane of the V-shaped grooves at approximately 90 degrees each and once again output in a direction that is approximately perpendicular to the principal surface, while light of the second polarization component (for example, the P polarization component) is transmitted and output from the back surface of the light guide plate. Since it is thereby possible to cause the opposing surface of the light guide plate to function as the polarization separation part and the recycle part, the number of parts can be further reduced and lower cost can be realized.

In the foregoing configuration, preferably, the light source is configured from a laser light source that outputs a laser beam, the laser beam is configured to enter approximately parallel to the side surface of the light guide plate, and the light guide plate includes a plurality of deflected surfaces having an inclination of approximately 45 degrees relative to the principal surface, and is configured to reflect the laser beam that has entered from the side surface by the deflected surface and output the laser beam approximately perpendicular to the principal surface.

In the foregoing case, since the color reproducibility will be superior as a result of using a laser beam, and the laser beam can be output from the light guide plate to the principal surface approximately perpendicular and then enter the liquid crystal panel approximately perpendicular, it is possible to realize a high contrast. It is thereby possible to realize an extremely high quality liquid crystal display device.

In the foregoing configuration, preferably, the deflected surface of the light guide plate is a polarization separation plane which reflects light of a first polarization component that is required for image display of the liquid crystal panel while transmitting light of a second polarization component that is orthogonal to the first polarization component.

In the foregoing case, even if the polarization of the light that entered the light guide plate is rotated while the light arrives at the deflected surface, it is possible to perform polarization separation on the deflected surface of the light guide plate. Thus, illuminating light with a high extinction ratio can be uniformly output from the light guide plate. It is thereby possible to display an image with a uniform and high contrast even with a large screen. Moreover, it is not necessary to provide a polarization element for improving the extinction ratio prior to causing light from the light source to enter the light guide plate, and this will lead to the reduction in the number of parts.

In the foregoing configuration, preferably, the polarization separation plane is configured by forming a dielectric multilayered film on the deflected surface.

In the foregoing case, since it is possible to realize a polarization separation plane with reflectance that is high relative to the light of the first polarization component (for example, S polarization) that is required for image display of the liquid crystal panel and with transmittance that is high relative to the light of the second polarization component (for example, P polarization) that is orthogonal to the first polarization component, illuminating light with a high extinction ratio can be uniformly output from the light guide plate.

In the foregoing configuration, preferably, the polarization separation plane is configured by forming fine grating that is subwavelength of light output from the light source on the deflected surface.

In the foregoing case, since the fine grating for performing polarization separation can be integrally formed with the light guide plate, it is possible to realize favorable mass productivity and lower costs.

In addition, the liquid crystal display device according to this embodiment may also be configured such that it does not include the deflection plate as with the following configuration. Here, preferably, the liquid crystal display device comprises a light source, a light guide plate for causing light from the light source to enter from a side surface and exit as illuminating light from one principal surface, a liquid crystal panel including a reflective color filter having wavelength selectivity in transmittance and reflectance and which is disposed on a light path of the illuminating light, and a recycle part for reflecting the illuminating light that was reflected with the reflective color filter toward the reflective color filter once again, wherein the transmittance of the illuminating light between the reflective color filter and the recycle part is 90% or higher.

In the foregoing case, light from the light source is guided to the liquid crystal panel, and light that entered the corresponding sub-pixels is transmitted and the remaining light can be reflected with the reflective color filter and reused. Here, since the transmittance of the light path through which the light to be reuse is repeatedly transmitted, it is possible to inhibit the light quantity loss of the light to be reused, and efficiently guide the light to the corresponding sub-pixels. It is thereby possible to realize a liquid crystal display device of extremely low power consumption.

Moreover, preferably, the liquid crystal display device according to this embodiment further comprises, in the foregoing configuration, a polarization separation part for separating light of a first polarization component that is required for image display of the liquid crystal panel from light of a second polarization component that is orthogonal to the first polarization component, wherein the polarization separation part is configured to output the light of the second polarization component in a direction that is different from the light of the first polarization component.

In the foregoing case, since the light of the polarization component to be used for image display can be guided to the liquid crystal panel at a high extinction ratio as a result of being transmitted through the polarization separation part, it is possible to improve the contrast and realize high picture quality.

Moreover, preferably, with the liquid crystal display device according to this embodiment in the foregoing configuration, the polarization separation part is configured as a structure possessing polarization anisotropy and configured to transmit light of the first polarization component and deflect light of the second polarization component by diffraction, refraction or scattering, and, preferably, further comprises a view angle control film for absorbing the light that was deflected with the polarization separation part.

In the foregoing case, since it is possible to configure a polarization separation part in which the transmittance of the first polarization component is extremely high, it is possible to further reduce the light quantity that is lost while reflection is repeated between the reflective color filter and the recycle part, and thereby realize still lower power consumption. Moreover, since light of the unwanted polarization component is absorbed by the view angle control sheet and will not be output from the screen of the liquid crystal display device, it is possible to prevent the contrast from deteriorating and realize a high quality picture.

Moreover, preferably, with the liquid crystal display device according to this embodiment in the foregoing configuration, the polarization separation part is configured as a polarization hologram which transmits light of the first polarization component while diffracting light of the second polarization component, and the polarization hologram is blazed.

In the foregoing case, since a polarization hologram with high diffraction efficiency can be realized, light with a high extinction ratio can be guided to the liquid crystal panel. In addition, if the polarization hologram is disposed between the reflective color filter and the recycle part, the laser beam will be transmitted through the polarization hologram numerous times. Thus, light with an extremely high extinction ratio can be guided to the liquid crystal panel. It is thereby possible to realize a high contrast liquid crystal display device.

Incidentally, the specific embodiments and examples in the detailed description of the invention are merely provided for demonstrating the technical content of the present invention, and the present invention should not be interpreted narrowly by being limited such specific examples. Thus, the present invention may be implemented in various modes within the spirit of this invention and the scope of claims provided below.

INDUSTRIAL APPLICABILITY

By applying the present invention, the laser beam that entered the light guide plate can be caused to fall incident on the respective pixels of the liquid crystal panel uniformly without waste. Thus, the present invention is useful in that it is possible to realize a thin liquid crystal display device of extremely low power consumption.

Moreover, by applying the present invention, it is possible to realize a high contrast liquid crystal display device with favorable color reproducibility, and the present invention is also useful in this respect.

The invention claimed is:
1. A liquid crystal display device, comprising:
a light source;
a light guide plate for causing light from the light source to enter from a side surface and exit as illuminating light from one principal surface;
a liquid crystal panel which includes a reflective color filter having wavelength selectivity in transmittance and reflectance and a polarizing plate disposed on a side closer to the light guide plate than the reflective color filter, and which is disposed on a light path of the illuminating light;

a recycle part for reflecting the illuminating light reflected with the reflective color filter toward the reflective color filter once again, and a polarization element for improving an extinction ratio of light entering the light guide plate in a light path between the light source and the light guide plate, wherein the light from the light source is configured to enter the light guide plate as approximately linear polarization, and the polarizing plate of the liquid crystal panel is configured to exhibit transmittance of 90% or higher.

2. The liquid crystal display device according to claim 1, wherein the polarization element is a polarization conversion element including a polarization beam splitter and a half wavelength plate for rotating polarization of one light split by the polarization beam splitter by 90 degrees.

3. A liquid crystal display device, comprising:

a light source;

a light guide plate for causing light from the light source to enter from a side surface and exit as illuminating light from one principal surface;

a liquid crystal panel which includes a reflective color filter having wavelength selectivity in transmittance and reflectance and a polarizing plate disposed on a side closer to the light guide plate than the reflective color filter, and which is disposed on a light path of the illuminating light; and a recycle part for reflecting the illuminating light reflected with the reflective color filter toward the reflective color filter once again, wherein the light from the light source is configured to enter the light guide plate as approximately linear polarization, the polarizing plate of the liquid crystal panel is configured to exhibit transmittance of 90% or higher, the liquid crystal panel includes a liquid crystal layer for modulating polarization of the illuminating light, and a transparent electrode and a liquid crystal driving element for driving the liquid crystal layer, and the reflective color filter is disposed on a side that is closer to the light guide plate than the transparent electrode and the liquid crystal driving element.

4. The liquid crystal display device according to claim 3, wherein the reflective color filter is disposed on a side that is closer to the light guide plate than the liquid crystal layer, and the transparent electrode and the liquid crystal driving element are disposed between the liquid crystal layer and the reflective color filter.

5. The liquid crystal display device according to claim 3, wherein the reflective color filter is disposed on a side that is closer to the light guide plate than the liquid crystal layer, and the transparent electrode and the liquid crystal driving element are disposed on a side that is opposite to the reflective color filter, with the liquid crystal layer interposing therebetween.

6. A liquid crystal display device, comprising:

a light source;

a light guide plate for causing light from the light source to enter from a side surface and exit as illuminating light from one principal surface;

a liquid crystal panel which includes a reflective color filter having wavelength selectivity in transmittance and reflectance and a polarizing plate disposed on a side closer to the light guide plate than the reflective color filter, and which is disposed on a light path of the illuminating light; and a recycle part for reflecting the illuminating light reflected with the reflective color filter toward the reflective color filter once again, wherein the light from the light source is configured to enter the light guide plate as approximately linear polarization, the polarizing plate of the liquid crystal panel is configured to exhibit transmittance of 90% or higher, and the reflective color filter includes polarization selectivity for selectively transmitting light of a first polarization component that is required for image display of the liquid crystal panel while selectively reflecting light of a second polarization component that is orthogonal to the first polarization component.

7. The liquid crystal display device according to claim 6, wherein the reflective color filter includes a first layer made of a high refractive index material, a second layer made of a low refractive index material, and a defect layer made of fine grating having a cycle that is subwavelength, the reflective color filter being configured as a multi-layered film in which at least one of the first layer and the second layer is laminated on either side of the defect layer, and including a plurality of filter regions having different corresponding wavelengths, and the defect layer is configured so that the duty ratio of the fine grating differs for each of the plurality of filter regions.

8. The liquid crystal display device according to claim 7, wherein the first layer, the second layer and the defect layer of the reflective color filter are configured to be of the same film thickness in the plurality of filter regions.

9. A liquid crystal display device, comprising:

a light source;

a light guide plate for causing light from the light source to enter from a side surface and exit as illuminating light from one principal surface;

a liquid crystal panel which includes a reflective color filter having wavelength selectivity in transmittance and reflectance and a polarizing plate disposed on a side closer to the light guide plate than the reflective color filter, and which is disposed on a light path of the illuminating light;

a recycle part for reflecting the illuminating light reflected with the reflective color filter toward the reflective color filter once again, and a polarization separation part for separating light of a first polarization component that is required for image display of the liquid crystal panel from light of a second polarization component that is orthogonal to the first polarization component, wherein the light from the light source is configured to enter the light guide plate as approximately linear polarization, the polarizing plate of the liquid crystal panel is configured to exhibit transmittance of 90% or higher, the liquid crystal panel includes a liquid crystal layer for modulating polarization of the illuminating light, the reflective color filter is disposed on a side that is closer to the light guide plate than the liquid crystal layer, and the polarization separation part is disposed between the liquid crystal layer and the reflective color filter.

10. The liquid crystal display device according to claim 9, wherein
the polarization separation part is configured from a wire grid polarizing plate disposed on a top surface of the reflective color filter.

11. A liquid crystal display device, comprising:
a light source;
a light guide plate for causing light from the light source to enter from a side surface and exit as illuminating light from one principal surface;
a liquid crystal panel which includes a reflective color filter having wavelength selectivity in transmittance and reflectance and a polarizing plate disposed on a side closer to the light guide plate than the reflective color filter, and which is disposed on a light path of the illuminating light; and
a recycle part for reflecting the illuminating light reflected with the reflective color filter toward the reflective color filter once again,
wherein the light from the light source is configured to enter the light guide plate as approximately linear polarization,
the polarizing plate of the liquid crystal panel is configured to exhibit transmittance of 90% or higher, and
the recycle part separates light of a first polarization component that is required for image display of the liquid crystal panel among the light reflected by the reflective color filter from light of a second polarization component that is orthogonal to first polarization component and reflects the separated light toward the reflective color filter once again, the recycle part being configured to absorb the separated light of the second polarization component or cause the separated light to propagate in a direction that is different from a direction of the light of the first polarization component.

12. The liquid crystal display device according to claim 11, wherein
the recycle part is configured from a wire grid polarizing plate that is disposed adjacent to an opposing surface facing the principal surface of the light guide plate.

13. The liquid crystal display device according to claim 11, wherein
the recycle part is configured from a polarized reflection sheet which is formed by laminating a dielectric film having anisotropy of a refractive index, and which reflects the light of the first polarization component while transmitting the light of the second polarization component,
the recycle part being disposed adjacent to an opposing surface facing the principal surface of the light guide plate.

14. The liquid crystal display device according to claim 11, wherein
the light guide plate is formed with a plurality of V-shaped grooves having an inclination of approximately 45 degrees relative to the principal surface on an opposing surface facing the principal surface, and
the recycle part is configured by forming, on an inclined plane of the V-shaped grooves, a dielectric multi-layered film which transmits the light of the second polarization component while reflecting the light of the first polarization component.

15. A liquid crystal display device, comprising:
a light source;
a light guide plate for causing light from the light source to enter from a side surface and exit as illuminating light from one principal surface;
a liquid crystal panel which includes a reflective color filter having wavelength selectivity in transmittance and reflectance and a polarizing plate disposed on a side closer to the light guide plate than the reflective color filter, and which is disposed on a light path of the illuminating light; and
a recycle part for reflecting the illuminating light reflected with the reflective color filter toward the reflective color filter once again,
wherein the light from the light source is configured to enter the light guide plate as approximately linear polarization,
the polarizing plate of the liquid crystal panel is configured to exhibit transmittance of 90% or higher,
the light source is configured from a laser light source that outputs a laser beam,
the laser beam is configured to enter approximately parallel to the side surface of the light guide plate,
the light guide plate includes a plurality of deflected surfaces having an inclination of approximately 45 degrees relative to the principal surface, and is configured to reflect the laser beam that has entered from the side surface by the deflected surface and output the laser beam approximately perpendicular to the principal surface, and
the deflected surface of the light guide plate is a polarization separation plane which reflects light of a first polarization component that is required for image display of the liquid crystal panel while transmitting light of a second polarization component that is orthogonal to the first polarization component.

16. The liquid crystal display device according to claim 15, wherein
the polarization separation plane is configured by forming a dielectric multi-layered film on the deflected surface.

17. The liquid crystal display device according to claim 15, wherein
the polarization separation plane is configured by forming fine grating that is subwavelength of light output from the light source on the deflected surface.

* * * * *